US008477358B2

(12) United States Patent
Sugimura et al.

(10) Patent No.: US 8,477,358 B2
(45) Date of Patent: Jul. 2, 2013

(54) PRINTER, TERMINAL, AND PRINTING SYSTEM WITH OPERATING STATE COMMUNICATION

(75) Inventors: Yoshihiko Sugimura, Nagoya (JP); Yoshitsugu Tomomatsu, Nagoya (JP); Hidekazu Ishii, Aisai (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1098 days.

(21) Appl. No.: 12/387,079

(22) Filed: Apr. 28, 2009

(65) Prior Publication Data

US 2009/0273803 A1 Nov. 5, 2009

(30) Foreign Application Priority Data

Apr. 30, 2008 (JP) .................................. 2008-118545

(51) Int. Cl.
*G06K 15/00* (2006.01)
*G06F 13/00* (2006.01)
(52) U.S. Cl.
USPC ......... 358/1.16; 358/1.15; 358/1.13; 711/115
(58) Field of Classification Search
USPC ................................................ 358/1.13–1.16
See application file for complete search history.

(56) References Cited

U.S. PATENT DOCUMENTS

| 4,989,163 | A | * | 1/1991 | Kawamata et al. | 358/1.6 |
|---|---|---|---|---|---|
| 6,181,440 | B1 | * | 1/2001 | Masuda | 358/434 |
| 6,691,187 | B1 | | 2/2004 | Schwerin | |
| 6,947,171 | B1 | | 9/2005 | Narusawa | |
| 8,024,722 | B2 | | 9/2011 | Lim et al. | |
| 2002/0101515 | A1 | * | 8/2002 | Yoshida et al. | 348/211 |
| 2004/0032618 | A1 | * | 2/2004 | Yano et al. | 358/1.16 |
| 2004/0036895 | A1 | * | 2/2004 | Yano et al. | 358/1.6 |
| 2005/0162688 | A1 | * | 7/2005 | Nakaoka et al. | 358/1.15 |
| 2005/0223323 | A1 | * | 10/2005 | Tanaka et al. | 715/526 |
| 2005/0257225 | A1 | * | 11/2005 | Choi et al. | 719/321 |
| 2006/0119889 | A1 | * | 6/2006 | Kim | 358/1.15 |

FOREIGN PATENT DOCUMENTS

| JP | 2002271721 A | 9/2002 |
|---|---|---|
| WO | 03/005214 | 1/2003 |
| WO | 2006/016852 | 2/2006 |

OTHER PUBLICATIONS

European Search Report, European Application No. 09159098.4, issued Jan. 4, 2013.

* cited by examiner

*Primary Examiner* — Dennis Dicker
(74) *Attorney, Agent, or Firm* — McCarter & English, LLP

(57) ABSTRACT

A printer includes a printer memory that stores information, a printer communication device that performs communication with a terminal, a printing device that prints based on print data, a receiving device that receives operating state information, the operating state information indicating that an operating state of the printer is one of a storage device state and a printing device state, the storage device state being an operating state that causes the terminal to recognize the printer as a device capable of using the printer memory, and the printing device state being an operating state that causes the terminal to recognize the printer as a device capable of printing by using the printing device, and a switching device that switches the operating state of the printer to one of the storage device state and the printing device state, based on the operating state information received by the receiving device.

4 Claims, 13 Drawing Sheets

US 8,477,358 B2

PRINTER, TERMINAL, AND PRINTING SYSTEM WITH OPERATING STATE COMMUNICATION

CROSS REFERENCE TO RELATED APPLICATION

This application claims priority to Japanese Application No. 2008-118545, filed Apr. 30, 2008, the content of which is hereby incorporated herein by reference in its entirety.

BACKGROUND

The present disclosure relates to a printer, a terminal, and a printing system. More specifically, the present disclosure relates to a printer, a terminal, and a printing system, which allow switching an operating state of the printer.

In recent years, a peripheral device that is to be connected to a personal computer (PC) via a universal serial bus (USB) is often provided with a specific interface in advance. When this sort of peripheral device is connected to the PC and plug-and-play communication is performed, the peripheral device is recognized as a specific device by the PC. For example, a USB memory is provided with a mass storage class interface, so the USB memory is recognized as a storage device. A printer is provided with a printer class interface, so the printer is recognized as a printing device. Moreover, an imaging device has been proposed that is provided with interfaces of a plurality of classes, such that the interface class can be switched as necessary (refer to Japanese Laid-Open Patent Publication No. 2002-271721).

SUMMARY

In the device described above, in a case where the interface class is to be switched by communication with a connected terminal, a user must go to the trouble of installing a special application for the terminal in advance. Further, in a case where the device itself is provided with a switch or the like for switching the interface class, the adding of the switch or the like necessitates extra cost, which hinders attempts to lower the cost of the entire device.

Various exemplary embodiments of the broad principles derived herein provide a printer that is capable of easily switching the operating state of the printer, a terminal for switching an operating state of the printer, and a printing system.

Exemplary embodiments provide a printer that includes a printer memory that stores information, a printer communication device that performs communication with a terminal, and a printing device that prints based on print data. The printer also includes a receiving device that receives operating state information, the operating state information indicating that an operating state of the printer is one of a storage device state and a printing device state, the storage device state being an operating state that causes the terminal to recognize the printer as a device capable of using the printer memory, and the printing device state being an operating state that causes the terminal to recognize the printer as a device capable of printing by using the printing device, and a switching device that switches the operating state of the printer to one of the storage device state and the printing device state, based on the operating state information received by the receiving device.

Exemplary embodiments also provide a terminal connectable to a printer. The terminal includes a terminal communication device that performs communication with the printer, a terminal memory that stores at least an executable file for a second editor program, the second editor program being a program for editing print data, an executable file receiving device that receives an executable file for a first editor program stored in a printer memory of the printer by using the terminal communication device, the first editor program being a program for editing the print data, a first execution device that executes the executable file for the first editor program received by the executable file receiving device, in a state in which the terminal recognizes the printer as a device capable of using the printer memory, and a second execution device that executes the executable file for the second editor program stored in the terminal memory, in a state in which the terminal recognizes the printer as a device capable of printing by using a printing device. The terminal also includes an operating state information transmission device that transmits to the printer operating state information. The operating state information is information for switching an operating state of the printer to one of a storage device state and a printing device state. The storage device state is an operating state that causes the terminal to recognize the printer as the device capable of using the printer memory, and the printing device state is an operating state that causes the terminal to recognize the printer as the device capable of printing by using the printing device. The terminal further includes a memory control device that stores currently edited data in one of the printer memory and the terminal memory, if the operating state information is transmitted by the operating state information transmission device while the print data is being edited, in one of a case where the first execution device executes the executable file for the first editor program to start up the first editor program and a case where the second execution device executes the executable file for the second editor program to start up the second editor program, the currently edited data being print data being edited, and an editing continuation device that continues editing the currently edited data stored by the memory control device, based on one of the started first editor program and the started second editor program, after the operating state of the printer has been switched based on the operating state information transmitted by the operating state information transmission device.

Exemplary embodiments further provide a printing system that includes a printer and a terminal that is connectable to the printer. The printer includes a printer memory that stores at least an executable file for a first editor program, the first editor program being a program for editing print data, a printer communication device that performs communication with the terminal, and a printing device that prints based on the print data. The printer also includes an operating state information receiving device that receives operating state information, the operating state information indicating that an operating state of the printer is one of a storage device state and a printing device state, the storage device state being an operating state that causes the terminal to recognize the printer as a device capable of using the printer memory, and the printing device state being an operating state that causes the terminal to recognize the printer as a device capable of printing by using the printing device, and a switching device that switches the operating state of the printer to one of the storage device state and the printing device state, based on the operating state information received by the operating state information receiving device. The terminal includes a terminal communication device that performs communication with the printer, a terminal memory that stores at least an executable file for a second editor program, the second editor program being a program for editing the print data and being different from the first editor program, an executable file receiving device that receives the executable file for the first editor program stored in the printer memory by using the terminal communication device, a first execution device that executes the executable file for the first editor program received by the executable file receiving device, in a state in which the terminal recognizes the printer as the device capable of using the printer memory, and a second execution device that executes the executable file for the second editor program stored in the terminal memory, in a state in which the terminal recognizes the printer as the device capable of printing by using the printing device. The terminal also includes an operating state information transmission device that transmits the operating state information to the printer, and a memory control device that stores currently edited data in one of the printer memory and the terminal memory, if the operating state information is transmitted by the operating state information transmission device while the print data is being edited, in one of a case where the first execution device executes the executable file for the first editor program to start up the first editor program and a case where the second execution device executes the executable file for the second editor program to start up the second editor program. The currently edited data is print data being edited. The terminal further includes an editing continuation device that continues editing the currently edited data stored by the memory control device, based on one of the started first editor program and the started second editor program, after the operating state of the printer has been switched based on the operating state information transmitted by the operating state information transmission device.

BRIEF DESCRIPTION OF THE DRAWINGS

Exemplary embodiments will be described below in detail with reference to the accompanying drawings in which.

DETAILED DESCRIPTION

Figure 1:
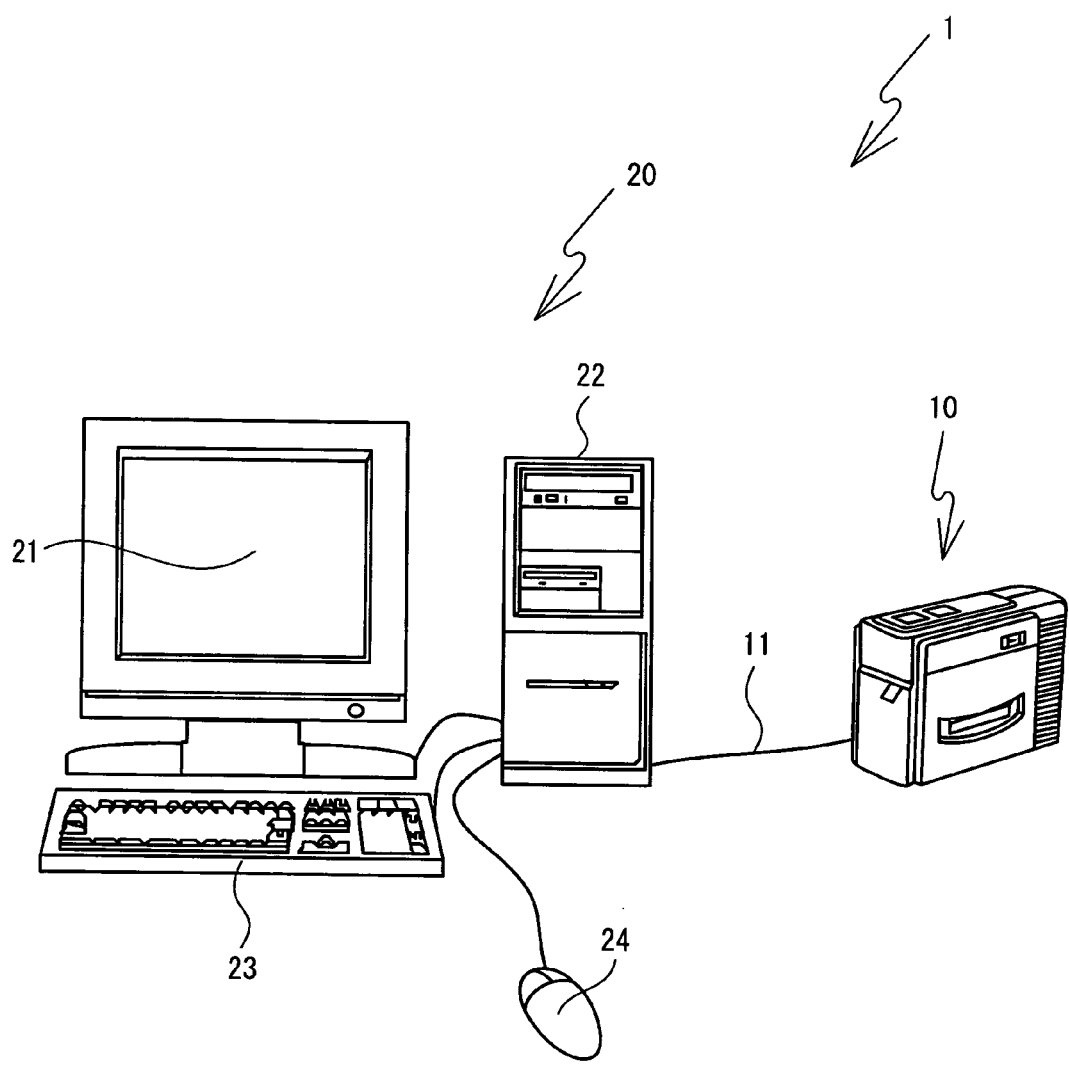
FIG. 1 is a schematic figure that shows a physical configuration of a printer and a personal computer that configure a printing system.

Hereinafter, a first embodiment of a printing system 1, a printer 10, and a personal computer 20 will be explained with reference to the drawings. The drawings are used for explaining technical features that the present disclosure can use, and the device configurations, the flowcharts of various types of processing, and the like that are shown in the drawings are merely explanatory examples and do not limit the present disclosure to only those configurations, flowcharts, and the like.

An overview of the printing system 1, the printer 10, and the personal computer 20 will be explained with reference to FIG. 1. As shown in FIG. 1, the printing system 1 includes the printer 10 and the personal computer 20, which are connected by a USB cable 11. The printer 10 is a label printer that performs printing on a print tape. The personal computer 20 is a desktop computer that is provided with a main unit 22, a display 21, a keyboard 23, a mouse 24, and so on. The personal computer 20 functions as a host that instructs the printer 10 to perform print processing.

Figure 2:
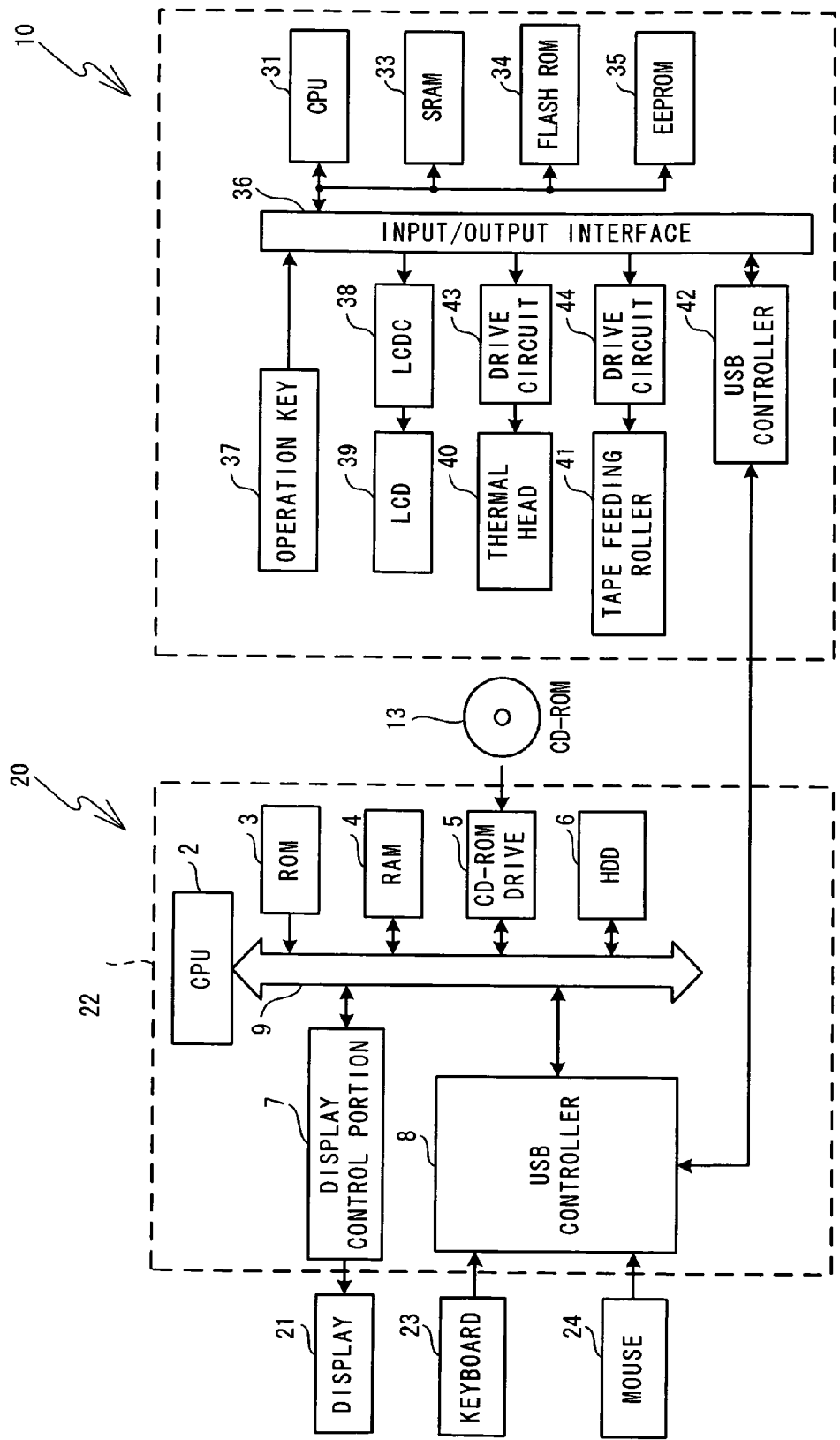
FIG. 2 is a schematic diagram that shows an electrical configuration of the printer and the personal computer.

Electrical configurations of the printer 10 and the personal computer 20 will be explained with reference to FIG. 2. As shown in FIG. 2, the printer 10 includes a CPU 31, a flash ROM 34, an SRAM 33, and an EEPROM 35. The CPU 31 performs overall control of the printer 10. The flash ROM 34 is a non-volatile storage element that does not lose data even if the power is turned off and that is readable and writable. The flash ROM 34 may store a control program and the like. The SRAM 33 is a volatile storage element that stores temporary data and the like that are created when the CPU 31 executes the control program. The EEPROM 35 is a non-volatile storage element that stores parameter information, history information, and the like for the printer 10. The CPU 31, the flash ROM 34, the SRAM 33, and the EEPROM 35 are mutually connected via a bus, such that the CPU 31 may refer to information that is stored in the flash ROM 34, the SRAM 33, and the EEPROM 35.

The printer 10 also includes an input/output interface 36. The input/output interface 36 is provided between the CPU 31 and various types of devices (an operation key 37, a display controller 38, drive circuits 43 and 44, a USB controller 42) that are connected to the CPU 31. The display controller 38 is hereinafter referred to as the "LCDC" 38. The input/output interface 36 performs voltage conversion processing, impedance conversion processing, timing adjustment processing, and the like between input and output signals. Accordingly, the various types of devices may recognize signals that the CPU 31 outputs to the various types of devices. The CPU 31 may also recognize signals that the various types of devices transmit to the CPU 31.

The printer 10 also includes the operation key 37. The operation key 37 may be operated by the user to cause the printer 10 to start up various types of desired operations. The operation key 37 and the input/output interface 36 are electrically connected, such that, in a case where the operation key 37 is operated by the user, the CPU 31 may recognize operation content.

The printer 10 also includes the LCDC 38 and a liquid crystal display (LCD) 39. The LCDC 38 includes a display RAM (not shown in the drawings), which stores display data. The LCDC 38 is electrically connected to the LCD 39 to control the LCD 39 and display the display data. The LCDC 38 is also electrically connected to the input/output interface 36 such that the CPU 31 may control the LCDC 38.

The printer 10 also includes a thermal head 40 and the drive circuit 43, which may control the thermal head 40. The thermal head 40 is a device that may transfer ink to the print tape by applying heat to an ink ribbon (not shown in the drawings). The drive circuit 43 is electrically connected to the thermal head 40 such that the drive circuit 43 may control the thermal head 40 and cause the thermal head 40 to perform printing on the print tape, based on the print data. The drive circuit 43 is also electrically connected to the input/output interface 36 such that the CPU 31 may control the drive circuit 43.

The printer 10 also includes a tape feeding roller 41 and the drive circuit 44, which may control the tape feeding roller 41. The tape feeding roller 41 feeds the print tape when the ink is transferred by the thermal head 40. The drive circuit 44 is electrically connected to the tape feeding roller 41, such that the drive circuit 44 may control the tape feeding roller 41 and cause the tape feeding roller 41 to feed the print tape when the thermal head 40 performs printing on the print tape, based on the print data. The drive circuit 44 is also electrically connected to the input/output interface 36 such that the CPU 31 may control the drive circuit 44.

The printer 10 also includes the USB controller 42. The USB controller 42 is a controller device that performs the voltage conversion processing and the impedance conversion processing such that the printer 10, which is connected to the personal computer 20 via the USB cable 11, may perform communication with the personal computer 20. The USB controller 42 and the input/output interface 36 are electrically connected, such that the CPU 31 may recognize a signal that is received from the personal computer 20 via the USB cable 11 and such that a signal that is transmitted by the CPU 31 may be transmitted to the personal computer 20 via the USB cable 11.

The electrical configuration of the personal computer 20 will be explained. The main unit 22 of the personal computer 20 includes a CPU 2, a ROM 3, a hard disk drive (HDD) 6, a RAM 4, and the like. The CPU 2 performs overall control of the personal computer 20. The ROM 3 stores a BIOS program that are read out when the CPU 2 is booted up, and the like. The HDD 6 stores executable files and the like for an operating system and an application. The RAM 4 is a volatile storage element that stores temporary data and the like that are required when the CPU 2 executes the operating system and the application. The ROM 3, the RAM 4, and the HDD 6 are each connected to the CPU 2 via a bus 9, such that the CPU 2 may refer to information that is stored in the ROM 3, the RAM 4, and the HDD 6.

The main unit 22 of the personal computer 20 also includes a display control portion 7. The display control portion 7 includes a display RAM (not shown in the drawings) that stores display data. The display control portion 7 is electrically connected to the display 21 via a video cable to cause the display data to be displayed by transmitting a control signal to the display 21. The display control portion 7 is also electrically connected to the bus 9, such that the CPU 2 may perform display control.

The main unit 22 of the personal computer 20 also includes a CD-ROM drive 5. The CD-ROM drive 5 is electrically connected to the bus 9, such that the CPU 2 may read out data that is stored in a CD-ROM 13 that is inserted into the CD-ROM drive 5.

The main unit 22 of the personal computer 20 also includes a USB controller 8. The USB controller 8 is a controller device that performs the voltage conversion processing and the impedance conversion processing such that a peripheral device may perform communication with the CPU 2 via a USB interface. In the example that is shown in FIG. 2, the keyboard 23, the mouse 24, and the printer 10 are connected to the USB controller 8. The USB controller 8 is also electrically connected to the bus 9, such that the CPU 2 may detect operation content of the keyboard 23 and the mouse 24, and such that communication may be performed between the printer 10 and the CPU 2.

Figure 3:
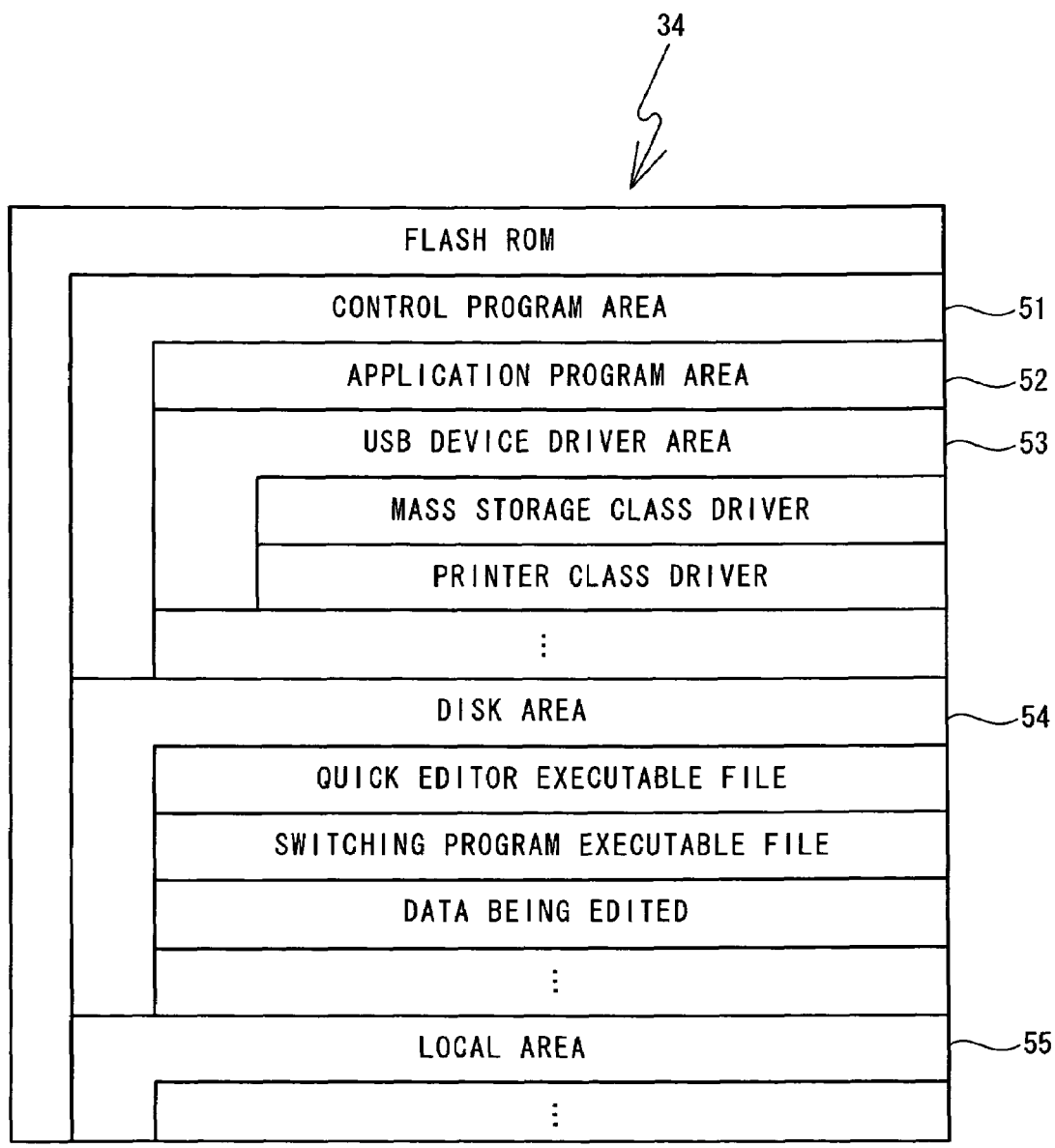
FIG. 3 is a schematic diagram that shows storage areas in a flash ROM.
Figure 4:
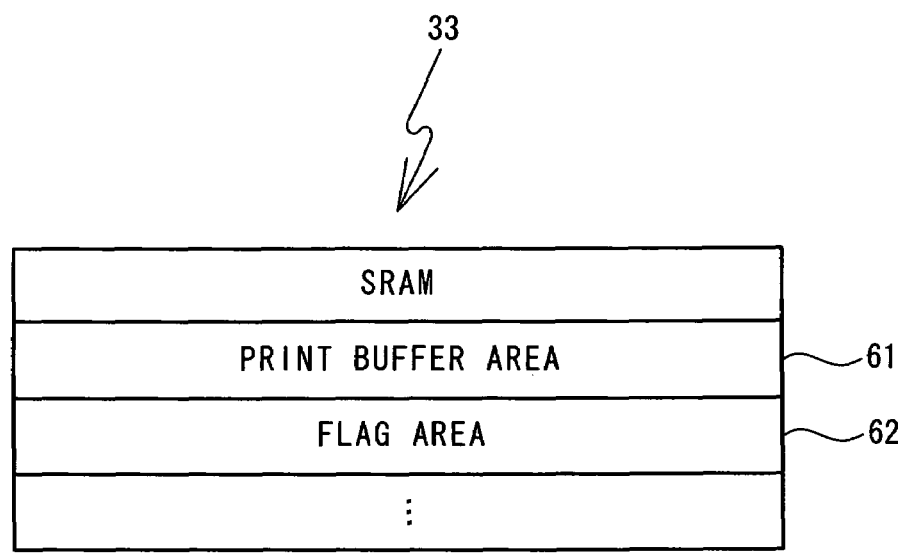
FIG. 4 is a schematic diagram that shows storage areas in an SRAM.

Storage areas of the flash ROM 34 and the SRAM 33 that are the storage elements that are included in the printer 10 will be explained with reference to FIGS. 3 and 4. The storage areas of the flash ROM 34 will be explained with reference to FIG. 3. The flash ROM 34 includes a control program area 51. The control programs that are used when the CPU 31 performs processing by controlling the various types of devices are stored in the control program area 51. The control program is read out by the CPU 31 in a case where the CPU 31 performs any of the various types of processing. The control program area 51 includes an application program area 52, a USB device driver area 53, and other areas.

A higher-level program of the control programs that the CPU 31 executes is stored in the application program area 52. The higher-level program may be, for example, a program for a file operation (writing, reading), a program for a determination based on the content of a file, a program for commands to various types of driver programs, or the like.

USB device drivers that perform protocol control for communication via the USB cable 11 are stored in the USB device driver area 53. Specifically, a mass storage class driver and a printer class driver are stored as the USB device drivers. In a case where the printer 10 performs communication with the personal computer 20 via the USB cable 11, one of the mass storage class driver and the printer class driver is read out and used by the CPU 31, as necessary.

In a case where the printer class driver is selected and used as the USB device driver by the CPU 31, the printer 10 is recognized as a printing device by the personal computer 20. Accordingly, the print data may be transmitted from the personal computer 20 to the printer 10 and printing on the print tape may be performed by the printer 10, in the same manner as with a known method of using an ordinary printer. Hereinafter, an operating state of the printer 10 in which the printer 10 is recognized as the printing device is referred to as the "printing device state".

In a case where the mass storage class driver is selected and used as the USB device driver by the CPU 31, the printer 10 is recognized as a storage device by the personal computer 20. Accordingly, a specific storage area in the printer 10 (a disk area 54 in the flash ROM 34, described below) may be used as a storage area of the personal computer 20. Hereinafter, an operating state of the printer 10 in which the printer 10 is recognized as the storage device is referred to as the "storage device state".

The flash ROM 34 also includes the disk area 54. In a case where the operating state of the printer 10 is the storage device state, the disk area 54 is set such that the disk area 54 may be used as a storage area of the personal computer 20. A quick editor executable file, a switching program executable file, currently edited data, and the like are stored in the disk area 54. The quick editor executable file is an executable file of a quick editor that is a program for editing the print data. Details of the quick editor will be explained below. The switching program executable file is an executable file of a switching program for switching the operating state of the printer 10. In a second embodiment that is described below, the switching program executable file is not necessarily stored in the disk area 54. The currently edited data is the print data that is in the process of being created by an editor. Details of the currently edited data will be described below.

The flash ROM 34 also includes a local area 55. The local area 55 is set such that the local area 55 cannot be accessed by the personal computer 20, although the disk area 54 can. The local area 55 stores parameter data for the programs and the like.

The storage areas of the SRAM 33 will be explained with reference to FIG. 4. The SRAM 33 includes a print buffer area 61, a flag area 62, and other storage areas. The print buffer area 61 temporarily stores the print data that is used when the printing of the print tape is performed. The flag area 62 stores flag information.

Storage areas of the HDD 6 and the RAM 4 that are included in the main unit 22 of the personal computer 20 will be explained. HDD 6 stores a full editor executable file, although not shown in the drawings. The full editor executable file is an executable file of a full editor that is a program for editing the print data. The RAM 4 stores the currently edited data, although not shown in the drawings.

The quick editor executable file, which is stored in the disk area 54 of the flash ROM 34 of the printer 10, and the full editor executable file, which is stored in the HDD 6 of the personal computer 20, will be explained. The quick editor executable file and the full editor executable file are programs for creating the print data that is required in a case where the print processing is performed in the printer 10 and are executable files for programs that may be executed by the personal computer 20. Starting up these executable files in the personal computer 20 makes it possible for the user to create the print data based on an editing program that is displayed on the display 21. The printer 10 performs the print processing based on the created print data.

Using the quick editor and the full editor, it is possible to create the print data by editing printing conditions (font, character size, character effects, and the like) in addition to text information. Therefore, the created print data includes the printing conditions (the font, the character size, the character effects, and the like) and the like, in addition to the text information. In a case where the print data is created using the full editor, it is possible to utilize almost all of the printing conditions that may be used in the printer 10. By contrast, in a case where the print data is created using the quick editor, it is possible to utilize only a part of the printing conditions that may be used in the printer 10. Accordingly, the data volume of the full editor executable file is larger than the data volume of the quick editor executable file. Therefore, the full editor executable file is stored in the HDD 6 of the personal computer 20, which has a large storage capacity. The quick editor executable file is stored in the flash ROM 34 of the printer 10, which does not have a large storage capacity.

The printing conditions that are included in the print data that is created using the quick editor may not completely match the printing conditions that are included in the print data that is created using the full editor. Hereinafter, the printing conditions that are included in the print data that is created using the quick editor are referred to as the "first printing conditions". Hereinafter, the printing conditions that are included in the print data that is created using the full editor are referred to as the "second printing conditions". The first printing conditions may include a printing condition that is not included in the second printing conditions. The second printing conditions may include a printing condition that is not included in the first printing conditions.

In order for the quick editor to be used in the personal computer 20, the quick editor executable file must be transferred via the USB cable 11 from the flash ROM 34 of the printer 10 to the personal computer 20 and be stored in the RAM 4 of the personal computer 20. In a case where the quick editor executable file is stored in the RAM 4, the quick editor may be started up (details will be described below).

The print data that is created using the full editor is transmitted to the printer 10 when the printer 10 is in the printing device state, and the print processing is performed in the printer 10. Therefore, in order for the print data to be transmitted to the printer 10, a printer driver, which allows transfer of the print data to the printer 10, must be installed in the personal computer 20 in advance. In contrast, the print data that is created using the quick editor is transferred to the printer 10 when the printer 10 is in the storage device state. Then, the print data is stored in the disk area 54 of the flash ROM 34, and the print processing is performed in the printer 10. In such a case, the printer driver for transmitting the print data to the printer 10 is not required, unlike the print processing in a case where the full editor is used.

Figure 5:
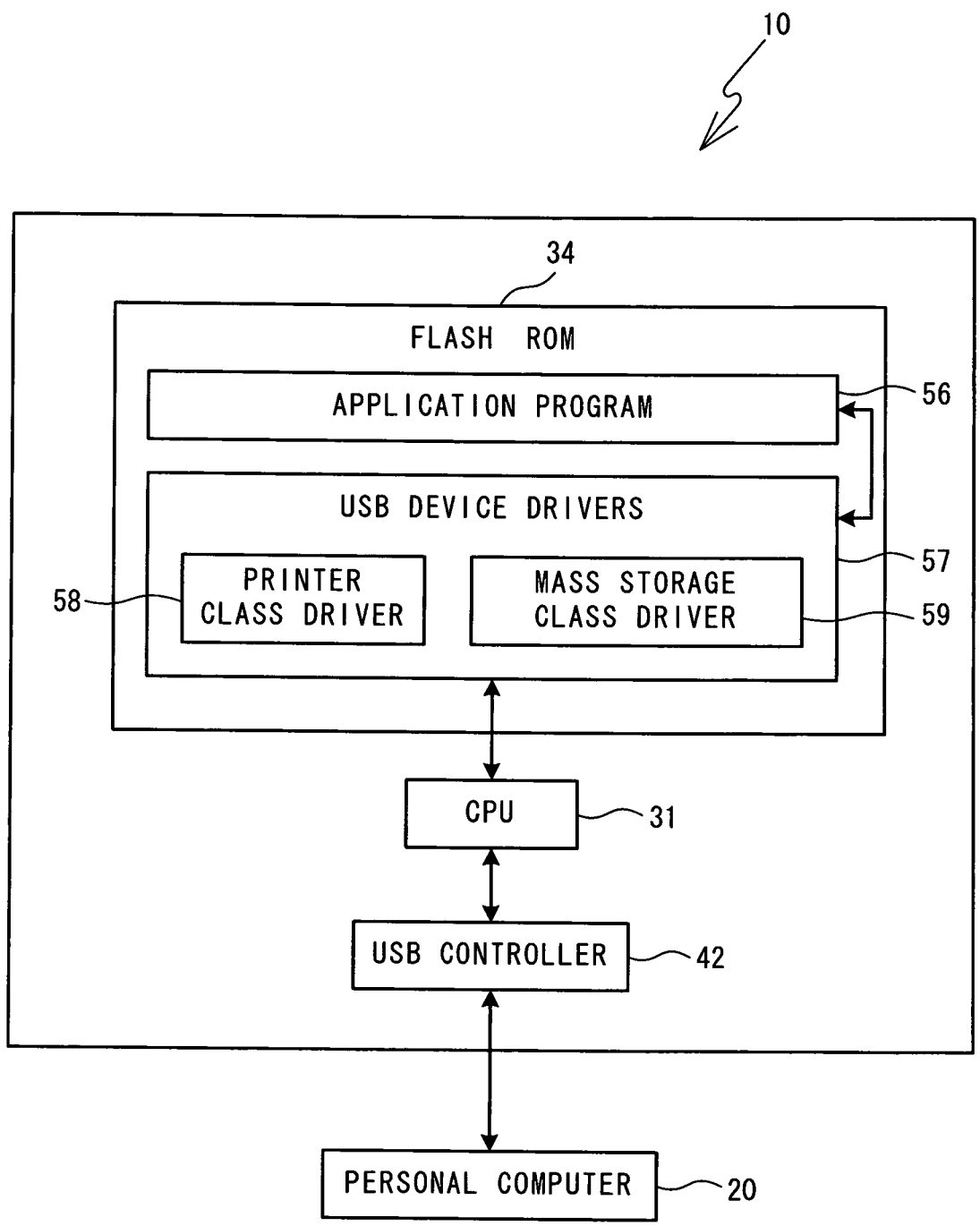
FIG. 5 is a block diagram that shows a flow of data between the printer and the personal computer.

A flow of the data in the printer 10 in a case where the CPU 31 of the printer 10 performs communication with the personal computer 20 will be explained with reference to FIG. 5. As shown in FIG. 5, the flash ROM 34 includes an application program 56 and USB device drivers 57 as control programs. Further, a printer class driver 58 and a mass storage class driver 59 are included as the USB device drivers 57. The USB device drivers 57 are programs that are read out in advance and used by the CPU 31 in a case where the CPU 31 controls the USB controller 42 to perform the communication with the personal computer 20 via the USB cable 11.

The CPU 31 performs the communication with the personal computer 20 via the USB cable 11 by selecting, reading out, and using one of the printer class driver 58 and the mass storage class driver 59 as the USB device driver 57. In a case where the CPU 31 selects the mass storage class driver 59 as the USB device driver 57, the personal computer 20 recognizes the printer 10 as a storage device. Accordingly, the disk area 54 of the flash ROM 34 may be used as a storage area of the personal computer 20 in a case where the personal computer 20 is in a state of being connected to the printer 10 via the USB cable 11.

In a case where the CPU 31 selects the printer class driver 58 as the USB device driver 57, the personal computer 20 recognizes the printer 10 as a printing device. Accordingly, the personal computer 20 may cause the printer 10 to perform the print processing by transferring the print data to the printer 10 and issuing a print command in a case where the personal computer 20 is in a state of being connected to the printer 10 via the USB cable 11.

The USB controller 42 is controlled based on the USB device driver 57 that is selected and read out, so that the CPU 31 may perform communication with the personal computer 20 via the USB cable 11.

Processing that is performed in the CPU 31 of the printer 10 and the CPU 2 of the personal computer 20 to switch the operating state of the printer 10 will be explained with reference to FIGS. 6 to 9. The white arrows in FIGS. 6 and 7 indicate the communication that is performed between the personal computer 20 and the printer 10 via the USB cable 11.

As explained briefly above, two methods of editing the print data, the method that uses the full editor and the method that uses the quick editor, are provided in the printing system 1 of the present disclosure. The full editor may be used by the user in a state in which the full editor has been installed in advance in the HDD 6 of the personal computer 20. The quick editor is stored in advance in the flash ROM 34 of the printer 10, and is read out from the printer 10 and used. The user may switch between and use the full editor and the quick editor according to the purpose (for example, what kind of print data the user desires to create) and the use environment (whether the full editor has been installed in advance in the personal computer 20, and the like).

When the power is turned on and the printer 10 starts up, the CPU 31 first reads out a switching flag that is stored in the flag area 62 of the SRAM 33. The switching flag is a flag to which the CPU 31 refers in order to select the USB device driver to be read out and used. In a case where zero is stored as the switching flag, the CPU 31 reads out and uses the mass storage class driver 59 as the USB device driver. In a case where 1 is stored as the switching flag, the CPU 31 reads out and uses the printer class driver 58 as the USB device driver. The switching flag is initialized to zero when the power is turned on.

Figure 6:
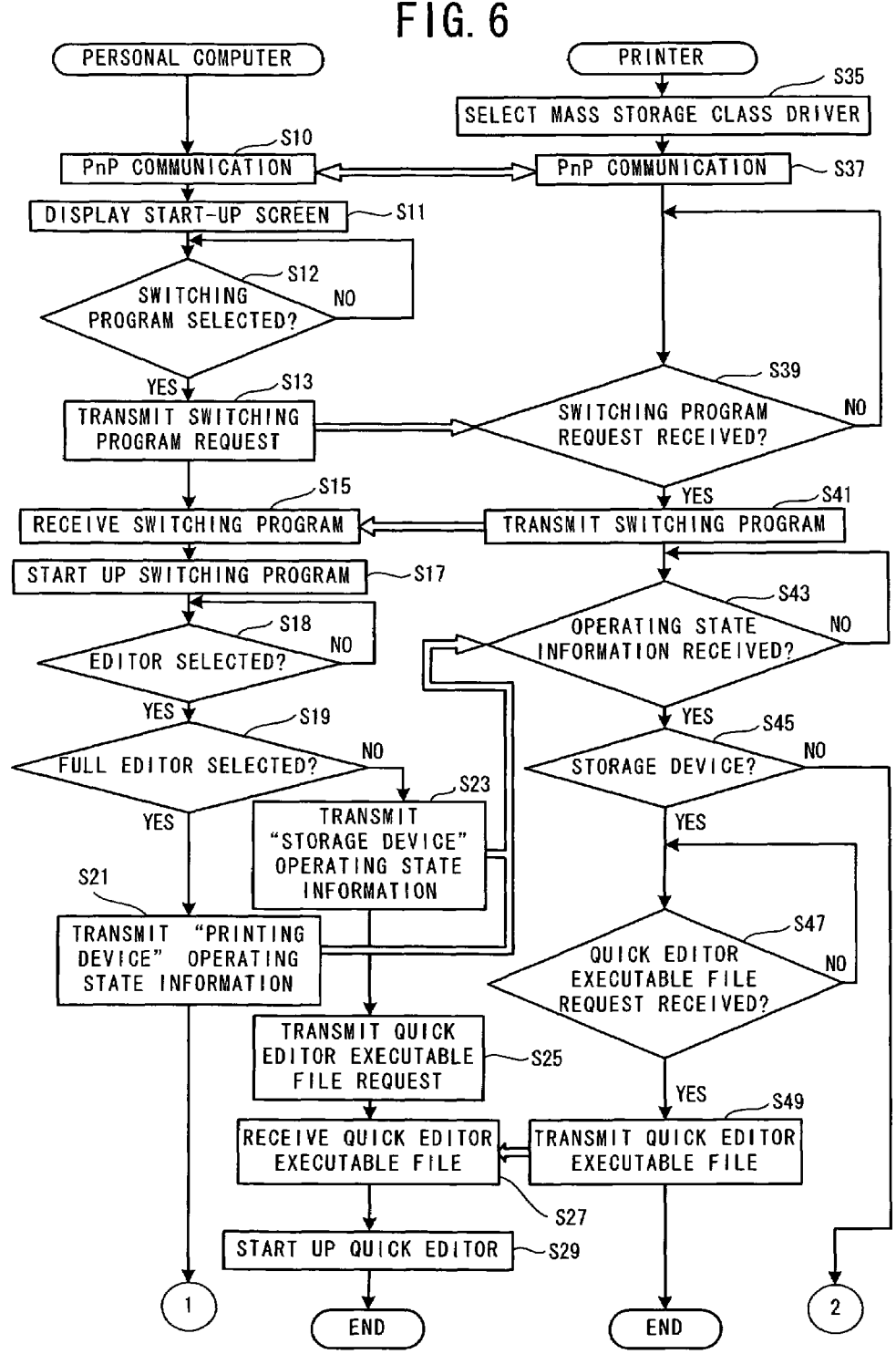
FIG. 6 is one part of a flowchart that shows a first embodiment of operating state switching processing.

As shown in FIG. 6, the CPU 31 reads out and refers to the switching flag. Zero is stored as the switching flag, so the CPU 31 selects and reads out the mass storage class driver as the USB device driver (step S35). Next, the CPU 31 sets the disk area 54 of the flash ROM 34 as a storage area that may be used by the personal computer 20. This causes the printer 10 to operate in the storage device state. In a case where the printer 10 is connected to the personal computer 20 via the USB cable 11, the printer 10 may be recognized as a storage device by the personal computer 20. This makes it possible for the data that is stored in the disk area 54 of the flash ROM 34 of the printer 10 to be used by the personal computer 20.

Next, the CPU 31 of the printer 10 sets a D+ signal of a signal line of the USB cable 11 to a pull-up state, such that the CPU 31 may detect that the printer 10 is connected to the personal computer 20 in a case where the printer 10 is connected to the personal computer 20 via the USB cable 11.

Next, the printer 10 is connected by the user to the personal computer 20 via the USB cable 11. The D+ signal of the signal line of the USB cable 11 is set to the pull-up state in the printer 10. Therefore, the personal computer 20 detects that the D+ signal is in the pull-up state to determine that the personal computer 20 is connected to the printer 10 via the USB cable 11.

Next, plug-and-play (PnP) communication is performed between the CPU 2 of the personal computer 20 and the CPU 31 of the printer 10 (step S10 for the CPU 2, step S37 for the CPU 31). In the PnP communication, the CPU 2 of the personal computer 20, which functions as a host, determines the operating state of the printer 10, which functions as a target. Here, the CPU 2 determines that the operating state of the connected printer 10 is in the storage device state in the PnP communication. In such a case, the CPU 2 may use the disk area 54 of the flash ROM 34 as a storage device.

Next, the CPU 2 of the personal computer 20 starts up a Windows (registered trademark) Explorer start-up screen. This causes the Windows (registered trademark) Explorer start-up screen to be displayed on the display 21 (S11). The switching program stored in the disk area 54 of the flash ROM 34 may be selected on the Windows (registered trademark) Explorer start-up screen. Hereinafter, the Windows (registered trademark) Explorer start-up screen is referred to as the "Explorer start-up screen".

Figure 8:
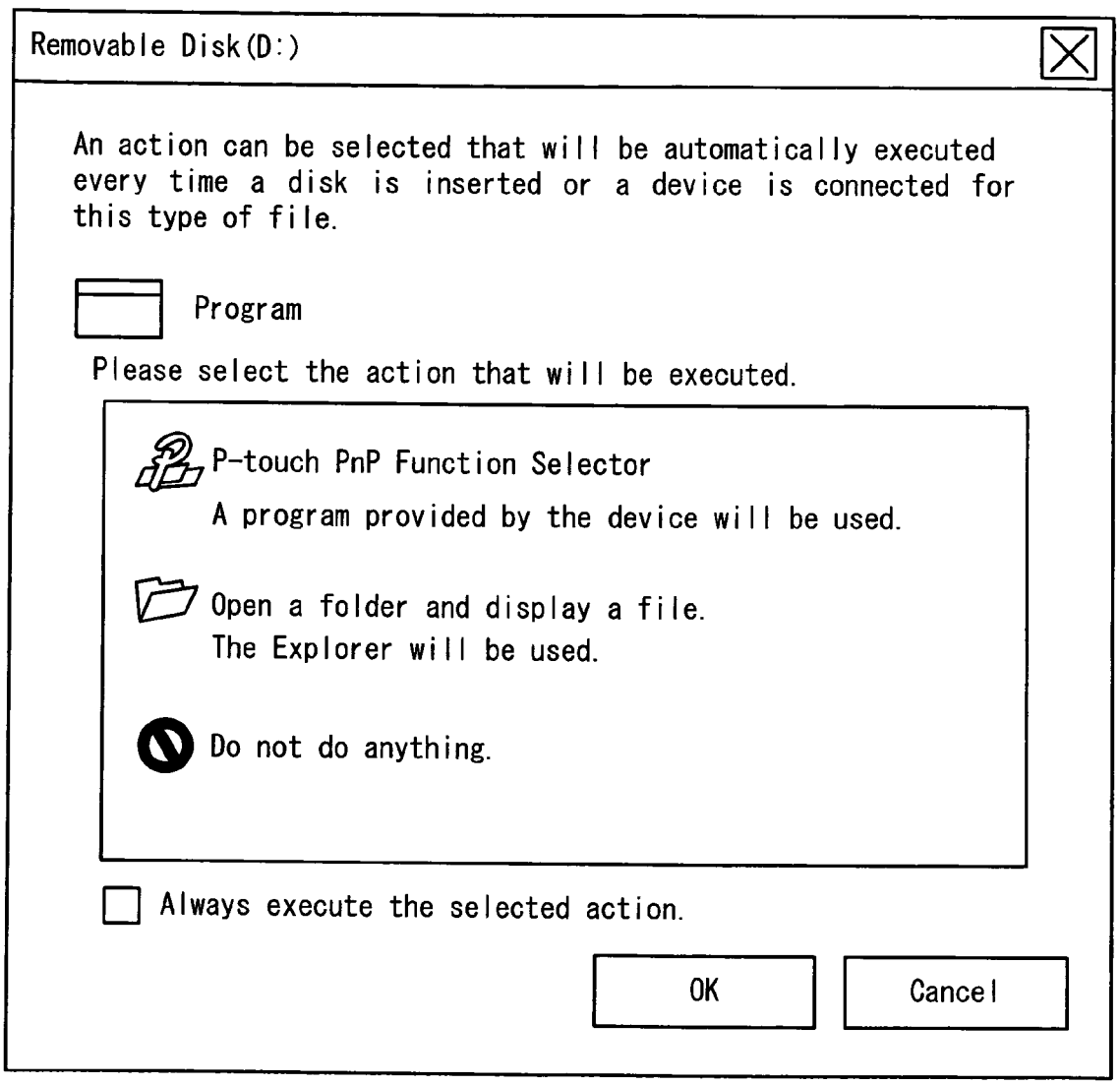
FIG. 8 is an example of a Windows (registered trademark) Explorer start-up screen that is displayed in the first embodiment.

An example of the Explorer start-up screen displayed on the display 21 at step S11 will be explained with reference to FIG. 8. The Explorer start-up screen displays at least an icon with the name of the switching program, "P-touch PnP Function Selector", and an icon that enables Windows (registered trademark) Explorer to be selected. Hereinafter, the icon with the name of the switching program is referred to as the "switching program icon". Hereinafter, the icon that enables Windows (registered trademark) Explorer to be selected is referred to as the "Explorer icon". In FIG. 8, the Explorer icon is displayed with the text "Open a folder and display a file".

After the PnP communication between the personal computer 20 and the printer 10 is performed as described above, the Explorer start-up screen is started up automatically in the personal computer 20 and displayed on the display 21. However, the Explorer start-up screen may also be displayed by a different method. For example, the user may start up Windows (registered trademark) Explorer by operating the personal computer 20, and the switching program icon stored in the disk area 54 of the flash ROM 34 may be displayed in Windows (registered trademark) Explorer.

Next, the CPU 2 waits while the switching program icon is not selected (NO at step S12). In order to create the print data to cause the printer 10 to perform printing, the user may operate the personal computer 20 to select the switching program icon.

If the CPU 2 detects an input from the user that selects the switching program icon (YES at step S12), in order to execute the selected switching program in the personal computer 20, the CPU 2 puts the switching program into an executable state by receiving the switching program executable file from the printer 10 and copying the switching program executable file to the RAM 4. Specifically, the CPU 2 performs processing to acquire the switching program executable file that is stored in the disk area 54 of the flash ROM 34 of the printer 10.

In order to acquire the switching program executable file from the printer 10, the CPU 2 transmits to the printer 10 a transmission request packet for the switching program executable file, thus requesting the printer 10 to transmit the switching program executable file (step S13).

After the PnP communication (step S37), the CPU 31 of the printer 10 waits while the CPU does not receive the transmission request packet for the switching program executable file from the personal computer 20 (NO at step S39). If the CPU 31 receives the transmission request packet for the switching program executable file that was transmitted from the personal computer 20 based on the processing at step S13 (YES at step S39), the CPU 31, in response to the request from the personal computer 20, transmits the switching program executable file that is stored in the disk area 54 of the flash ROM 34 to the personal computer 20 (step S41).

The CPU 2 of the personal computer 20 receives the switching program executable file that is transmitted by the printer 10, based on the processing at step S41, in response to the transmission request packet for the switching program executable file that was transmitted at step S13 (step S15). Once the CPU 2 stores the received switching program executable file in the RAM 4, it is possible for the switching program executable file to be started up, so the CPU 2 then starts up the switching program executable file (step S17).

Figure 9:
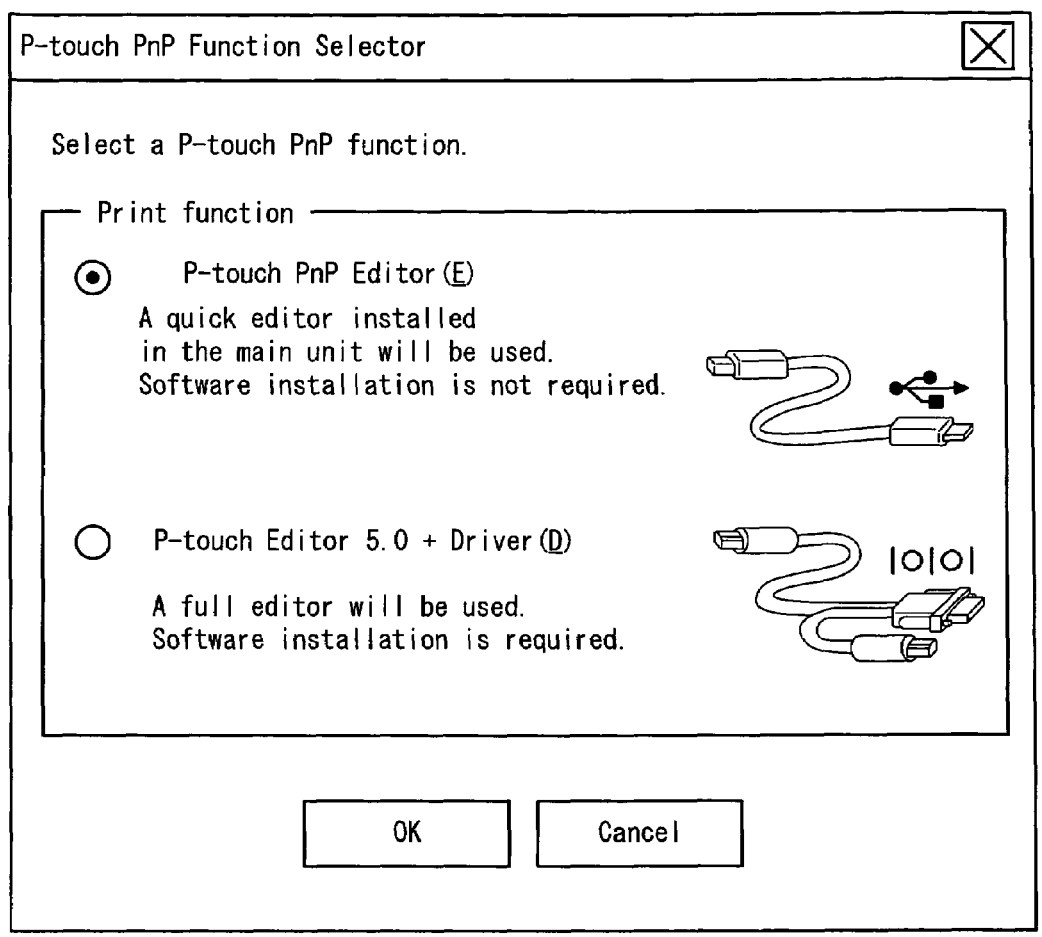
FIG. 9 is an example of a function selection tool display screen.

An example of a function selection tool display screen displayed on the display 21 of the personal computer 20 by the starting up of the switching program executable file at step S17 will be explained with reference to FIG. 9. As shown in FIG. 9, when the switching program executable file is started up, radio buttons that are used when selecting one of a P-touch PnP Editor and a P-touch Editor 5.0 Driver are displayed, as are buttons that are used when selecting one of "OK" and "cancel". The P-touch PnP Editor radio button is provided for selecting the quick editor as the editor for editing the print data. The P-touch Editor 5.0 Driver radio button is provided for selecting the full editor as the editor for editing the print data. The "OK" button is provided for enabling the selected radio button. The "cancel" button is provided for disabling the selected radio button.

Using the switching program that is being executed, the user may select one of the quick editor and the full editor as the print data editor. The quick editor executable file is stored in the flash ROM 34 of the printer 10 in advance, so the quick editor may be executed even if the quick editor executable file has not been installed in the personal computer 20 in advance. As shown in FIG. 9, a message is displayed that says, "A quick editor installed in the main unit will be used. Software installation is not required." In a case where the full editor is used, the full editor needs to be installed in the personal computer 20 in advance. As shown in FIG. 9, a message is displayed that says, "A full editor will be used. Software installation is required."

As described above, the CPU 2 of the personal computer 20 displays the Explorer start-up screen (refer to FIG. 8) on the display 21 and prompts the user to select the switching program. In a case where the switching program is selected, the CPU 2 starts up the switching program. However, the switching program may also be started up by a different method. For example, after the PnP communication (step S10) ends automatically, the switching program may be started up automatically, and the switching of the programs by the user may also be enabled.

As shown in FIG. 6, after the switching program is started up (step S17), the CPU 2 waits while an editor selection input is not made by the user (NO at step S18). If the CPU 2 detects that a radio button for the editor to be used (refer to FIG. 9) has been selected by the user and that the "OK" button has been selected (refer to FIG. 9) (YES at step S18), the CPU 2 determines which one of the quick editor and the full editor has been selected (step S19) and performs processing for starting up the selected editor.

The user may also select the quick editor in the case where the full editor cannot be used because the full editor has not been installed in the personal computer 20, as well as in a case where the user wants to perform the work of creating the print data easily. If the CPU 2 detects that the quick editor has been selected (NO at step S19), the CPU 2 performs processing for executing the quick editor (step S23 to step S29). On the other hand, in the case where the full editor has been installed in the personal computer 20, so the full editor can be used, as well as in a case where the user wants to perform complicated editing work on the print data, the user may select the full editor. If the CPU 2 detects that the full editor has been selected (YES at step S19), the CPU 2 performs processing for executing the full editor (step S21 to step S33; refer to FIGS. 6 and 7).

The case in which the user selects the quick editor will be explained. If the CPU 2 detects that the quick editor has been selected (NO at step S19), it is necessary for the CPU 2 to start up the quick editor in the personal computer 20. The quick editor executable file is stored in the disk area 54 of the flash ROM 34. Therefore, the CPU 2 needs to acquire the quick editor executable file from the printer 10 and copy the quick editor executable file to the RAM 4. Accordingly, the CPU 2 transmits to the printer 10 an information data packet that notifies the printer 10 that the operating state of the printer 10 is to be maintained in the storage device state (step S23). Next, in order for the quick editor executable file to be acquired by the personal computer 20, the CPU 2 transmits a transmission request packet for the quick editor executable file to the printer 10 (step S25).

After transmitting the switching program executable file to the personal computer 20 (step S41), the CPU 31 of the printer 10 waits while a packet of information that indicates whether the operating state is to be maintained in the storage device state or to be changed to the printing device state is not received from the personal computer 20 (NO at step S43). Hereinafter, the information that indicates whether the operating state is to be maintained in the storage device state or to be changed to the printing device state is referred to as the "operating state information". The CPU 31 receives the operating state information (YES at step S43) and determines whether the received operating state information is the operating state information that was transmitted from the personal computer 20 based on the processing at step S23 (the information for maintaining the printer 10 in the storage device state) (YES at step S45). This sort of case may correspond to the case in which the user is trying to create the print data using the quick editor.

Next, the CPU 31 waits while CPU 31 does not receive the transmission request packet for the quick editor executable file from the personal computer 20 (NO at step S47). If the CPU 31 receives the transmission request packet for the quick editor executable file that is transmitted from the personal computer 20 based on the processing at step S25 (YES at step S47), the CPU 31 transmits to the personal computer 20 the quick editor executable file that is stored in the disk area 54 of the flash ROM 34 (step S49). The operating state switching processing in the CPU 31 then ends.

After transmitting the transmission request packet for the quick editor executable file to the printer 10 (step S25), the CPU 2 of the personal computer 20 receives the quick editor executable file that is transmitted from the printer 10 based on the processing at S49 (step S27). Next, the CPU 2 stores the received quick editor executable file in the RAM 4. This makes it possible for the user to create the print data using the quick editor in the personal computer 20. Next, the CPU 2 starts up the quick editor executable file that is stored in the RAM 4 (step S29). Then, the user may operate the keyboard 23 and the mouse 24 to create the print data. The operating state switching processing in the CPU 2 then ends.

The print data that is created using the quick editor is transferred to the printer 10 and stored directly in the disk area 54 of the flash ROM 34. In this state, the print processing may be performed based on the print data in the printer 10. In a case where a print command that is entered by the user is received, the CPU 31 of the printer 10, based on the print data that is stored in the disk area 54, controls the drive circuits 43 and 44 to drive the thermal head 40 and the tape feeding roller 41 such that the processing to print on the print tape is performed.

Because the printer 10 may start up in the storage device state, as explained above, for the personal computer 20 may use the quick editor executable file that is stored in the disk area 54 of the flash ROM 34 of the printer 10. Accordingly, the print data may be created in the personal computer 20 with the quick editor. Therefore, even if a program to create the print data has not been installed in the personal computer 20 in advance, it is possible to create the print data in the personal computer 20 by connecting the personal computer 20 to the printer 10.

The CPU 2 of the personal computer 20 stores the print data that is created with the quick editor in the disk area 54 of the flash ROM 34 of the printer 10, which the CPU 2 recognizes as a storage device. In a case where the print data is stored in the disk area 54, it is possible for the print processing to be performed in the printer 10 based on the stored print data. In a case where the print processing is performed using an ordinary printer, a printer driver must be installed in advance in a host (a personal computer) that is connected to the printer. However, with the printer 10 in the first embodiment, the printer 10 may be recognized as a storage device by the personal computer 20. Therefore, it is possible to store the print data in the printer 10 without installing the driver in advance. Accordingly, the print processing may be performed easily in the printer 10.

The case in which the full editor has been installed in the personal computer 20 in advance and the user uses the switching program to select the full editor (YES at step S19) will be explained with reference to FIGS. 6 and 7. In a case where the user creates the print data using the full editor and the print processing is performed in the printer 10 based on the created print data, the personal computer 20 needs to recognize the printer 10 as a printing device. Therefore, the printer 10 needs to operate as a printing device. As described briefly above, the printer 10 operates in the storage device state immediately after the power is turned on. Therefore, before starting up the full editor executable file, the CPU 2 performs processing to switch the operating state of the printer 10.

As shown in FIG. 6, if the CPU 2 detects that the full editor has been selected (YES at step S19), the CPU 2 transmits to the printer 10 the operating state information to switch the operating state of the printer 10 to the printing device state (step S21).

After transmitting the switching program executable file to the personal computer 20 (step S41), the CPU 31 of the printer 10 waits while the CPU 31 does not receive a packet of the operating state information from the personal computer 20 (NO at step S43). If the CPU 31 receives the operating state information (YES at step S43), the CPU 31 determines whether the received operating state information is the operating state information that was transmitted from the personal computer 20 based on the processing at step S21 (the information for switching the operating state of the printer 10 to the printing device state) (NO at step S45). This sort of case may correspond to the case in which the user is trying to create the print data using the full editor.

Figure 7:
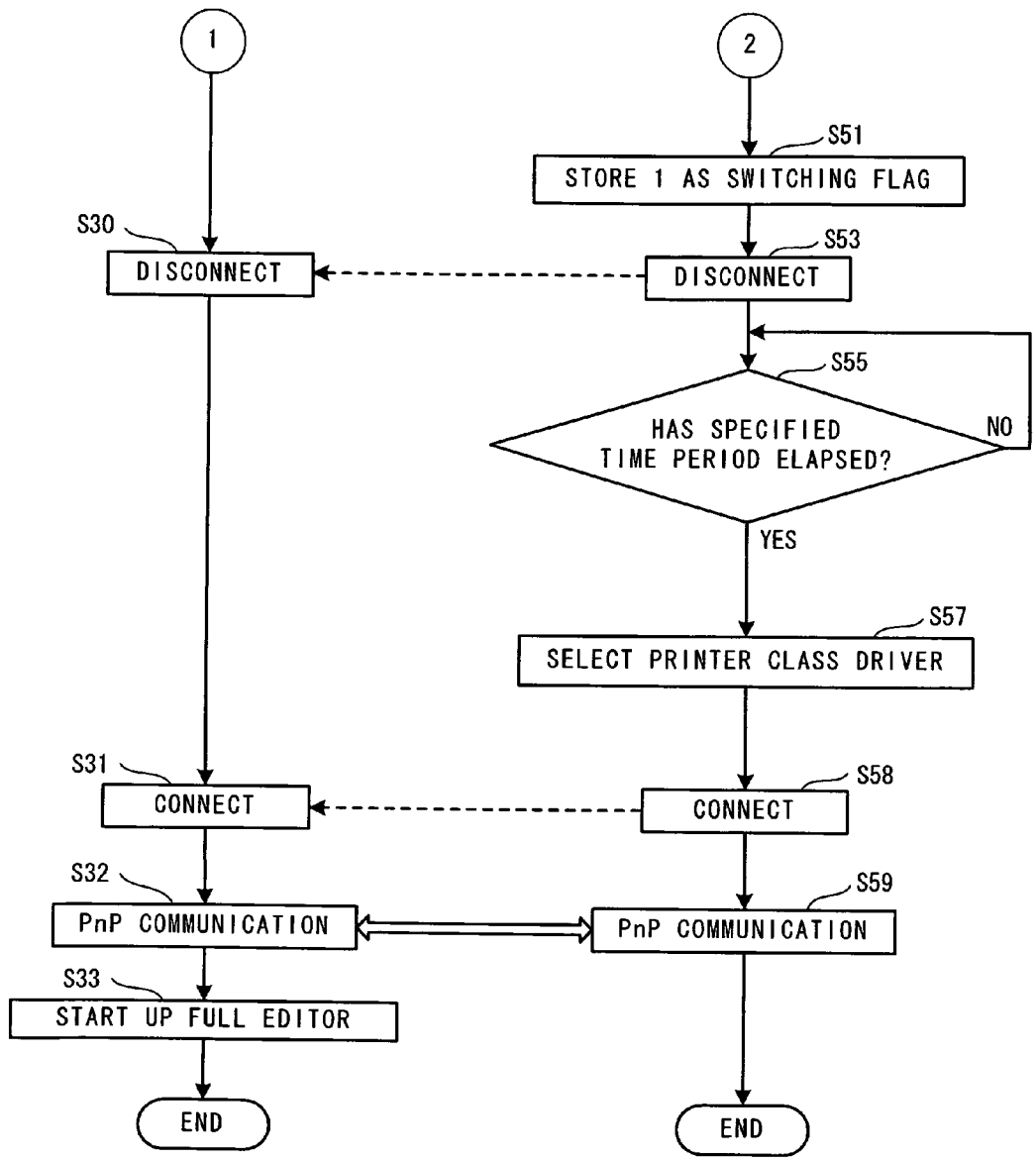
FIG. 7 is the other part of the flowchart that shows the first embodiment of the operating state switching processing.

Next, as shown in FIG. 7, in order to select and read the printer class driver as the USB device driver, the CPU 31 stores 1 as the switching flag, which is stored in the flag area 62 of the SRAM 33 (step S51). Next, in order to cause the personal computer 20 to determine that the connection to the printer 10 has been disconnected, the CPU 31 cancels the pull-up setting that was set for the D+ signal in the signal line of the USB cable 11 and puts the D+ signal into a high-impedance state (step S53). Then, the CPU 2 of the personal computer 20 detects that the D+ signal has been changed from the pull-up state to the high-impedance state. This enables the CPU 2 to recognize that the printer 10 that was connected via the USB cable 11 has been disconnected (step S30).

Next, in order to allow the CPU 2 to determine with certainty that the personal computer 20 is in a state of disconnection from the printer 10, the CPU 31 of the printer 10 waits while a specified period of time has not elapsed (NO at step S55). After the specified period of time has elapsed (YES at step S55), the CPU 31, in order to read out and use the USB device driver, reads out the switching flag that is stored in the flag area 62 of the SRAM 33. In this case, because 1 was stored as the switching flag in the processing at step S51, the CPU 31 selects and reads out the printer class driver as the USB device driver (step S57).

Next, in order to cause the personal computer 20 to determine that the personal computer 20 is connected to the printer 10, the CPU 31 once again resets the D+ signal of the signal line of the USB cable 11 from the high-impedance state to the pull-up state (step S58). Then, the CPU 2 of the personal computer 20 detects that the D+ signal has been changed to the pull-up state. This enables the CPU 2 to determine that the printer 10 is connected via the USB cable 11 (step S31).

Next, PnP communication is performed between the CPU 2 of the personal computer 20 and the CPU 31 of the printer 10 (step S32 for the CPU 2, step S59 for the CPU 31). In the PnP communication, data packet communication is performed in order for the CPU 2 of the personal computer 20, which functions as the host, to determine the state of the printer 10, which functions as the target. Here, the CPU 2 determines that the operating state of the connected printer 10 is the printing device state. In such a case, the CPU 2 may cause print processing to be performed by transmitting the print data to the printer 10.

Next, the full editor installed in the personal computer 20 in advance is started up by the CPU 2 (step S33), and the processing to create the print data may be performed by the user. The operating state switching processing in the CPU 2 then ends.

The print data that has been created with the full editor is stored in the HDD 6 of the personal computer 20. Then, in a case where the print processing is performed based on the print data, the print data is transmitted to the printer 10 via the USB cable 11, along with a print command to the printer 10. If the CPU 31 of the printer 10 receives the print data via the USB cable 11, the CPU 31 temporarily stores the received print data in the print buffer area 61 of the SRAM 33. Based on the stored print data, the CPU 31 controls the drive circuits 43 and 44 to drive the thermal head 40 and the tape feeding roller 41 such that the processing to print on the print tape is performed.

As explained above, the printer 10 is switched to and operated in the printing device state, so that the print data that is created using the full editor installed in advance in the personal computer 20 may be transmitted to the printer 10 and the print processing based on the print data may be performed. The switching program may also be used in the personal computer 20 in a state of connection to the printer 10 to switch the operating state of the printer 10. This makes it possible for the user to use the full editor, which is the editing program installed in the personal computer 20 in advance, and the quick editor, which is the editing program stored in the printer 10, as required.

The present disclosure is not limited to the first embodiment described above, and various types of modifications may be possible. The specific method for changing the operating state of the printer 10 is not limited to the method in step S51 to step S58 in FIG. 7. For example, a display that prompts the user to disconnect and reconnect the USB cable 11 may also be displayed on the display 21 of the personal computer 20. The user's disconnecting and reconnecting of the USB cable 11 between the personal computer 20 and the printer 10 may also cause the personal computer 20 to recognize that the printer 10 is connected to the personal computer 20.

In order for the full editor to be selected when the switching program is executed and for the full editor to be used to cause the printer 10 to perform the print processing, the printer driver must be installed in the personal computer 20 in advance in order to make it possible for the print data to be transferred to the printer 10. In the first embodiment, the full editor is installed in the personal computer 20. However, in a case where the printer driver has not been installed, a wizard screen to prompt the user to install the printer driver may also be displayed on the display 21 of the personal computer 20, and the printer driver may be installed before the full editor is started up.

In the first embodiment, the print data created using the full editor is transferred to the printer 10 in the printing device state, and the print processing is performed in the printer 10. However, the print processing may not be performed by the printer 10 in the printing device state. For example, the print data may be created using the full editor, and then the operating state of the printer 10 may be changed from the printing device state to the storage device state. Then the CPU 2 of the personal computer 20 may also store the print data in the disk area 54 of the flash ROM 34 of the printer 10 in the storage device state. Then, by transmitting the print command to the printer 10, the CPU 2 may cause the print processing to be performed based on the print data stored in the printer 10.

Hereinafter, a second embodiment will be explained with reference to FIGS. 10 to 13. The configuration of the printing system 1, the electrical configurations of the printer 10 and the personal computer 20, and the configurations of the storage areas are the same as in FIGS. 1 to 5 in the first embodiment, so explanations of those points will be simplified or omitted below.

In the second embodiment, the quick editor includes the function for switching the operating state of the printer 10 that the switching program has in the first embodiment. Therefore, in a state in which the quick editor has been started up, when the user wants to switch the operating state of the printer 10 to use the full editor, the user may use the function for switching the operating state of the printer 10 that is provided in the quick editor.

When the power is turned on and the printer 10 starts up, the CPU 31 reads out the switching flag that is stored in the flag area 62 of the SRAM 33, in the same manner as in the first embodiment. Zero is stored as the switching flag, so the CPU 31 selects and reads out the mass storage class driver as the USB device driver (step S121). Then, the CPU 31 sets the disk area 54 of the flash ROM 34 as the storage area that may be used by the personal computer 20. Thus, the printer 10 operates in a storage device. In a case where the printer 10 is connected to the personal computer 20 via the USB cable 11, the printer 10 may be recognized as a storage device by the personal computer 20. Therefore, it is possible for data that is stored in the disk area 54 of the flash ROM 34 of the printer 10 to be used by the personal computer 20.

Next, in the same manner as in the first embodiment, the CPU 31 of the printer 10 sets the D+ signal of the signal line of the USB cable 11 to the pull-up state. When the printer 10 and the personal computer 20 are then connected by the user via the USB cable 11, the personal computer 20 detects that the D+ signal of the signal line of the connected USB cable 11 is in the pull-up state and determines that the printer 10 is connected via the USB cable 11.

Next, in the same manner as in the first embodiment, the PnP communication is performed between the CPU 2 of the personal computer 20 and the CPU 31 of the printer 10 (step S100 for the CPU 2, step S123 for the CPU 31). Here, the CPU 2 determines that the operating state of the connected printer 10 is the storage device state. In such a case, the CPU 2 may use the disk area 54 of the flash ROM 34 as a storage device.

Next, the CPU 2 of the personal computer 20 starts up the Explorer start-up screen. Thus the Explorer start-up screen is displayed on the display 21 (step S101), making it possible to select the quick editor executable file that is stored in the disk area 54 of the flash ROM 34.

Figure 12:
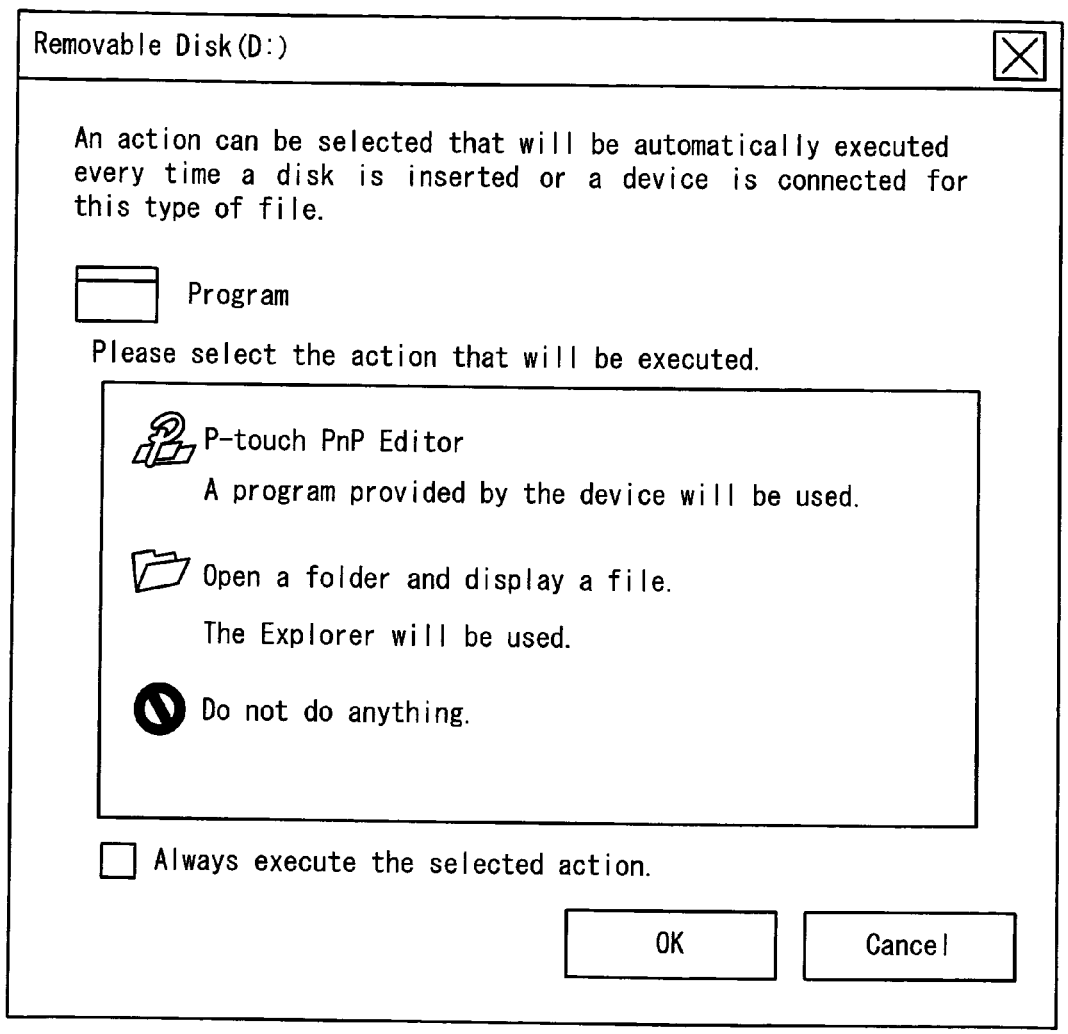
FIG. 12 is an example of a Windows (registered trademark) Explorer start-up screen that is displayed in the second embodiment.

An example of the Explorer start-up screen that is displayed on the display 21 at step S101 will be explained with reference to FIG. 12. The Explorer start-up screen displays at least an icon with the name of the quick editor, "P-touch PnP Editor", and the Explorer icon. Hereinafter, the icon with the name of the quick editor, "P-touch PnP Editor", is referred to as the quick editor icon. In FIG. 12, the Explorer icon is displayed with the text "Open a folder and display a file".

After the PnP communication between the personal computer 20 and the printer 10 is performed as described above, the Explorer start-up screen is started up automatically in the personal computer 20 and displayed on the display 21. However, the Explorer start-up screen may also be displayed by a different method. For example, the user may start up Windows (registered trademark) Explorer by operating the personal computer 20, and an icon for selecting the quick editor stored in the disk area 54 of the flash ROM 34 may be displayed in Windows (registered trademark) Explorer.

Next, the CPU 2 waits while the quick editor icon is not selected (NO at step S102). In order to create the print data to cause the printer 10 to perform printing, the user may operate the personal computer 20 to select the quick editor icon.

In a case where the CPU 2 detects an input from the user that selects the quick editor icon, in order to execute the selected quick editor in the personal computer 20, the CPU 2 must put the quick editor into an executable state by receiving the quick editor executable file from the printer 10 and copying the quick editor executable file to the RAM 4. Accordingly, the CPU 2 performs processing to acquire the quick editor executable file that is stored in the disk area 54 of the flash ROM 34 of the printer 10.

In order to acquire the quick editor executable file from the printer 10, the CPU 2 transmits a transmission request packet for the quick editor executable file to the printer 10, thus requesting the printer 10 to transmit the quick editor executable file (step S103).

After the PnP communication, the CPU 31 of the printer 10 waits while the CPU 31 does not receive the transmission request packet for the quick editor executable file from the personal computer 20 (NO at step S124). In a case where the CPU 31 receives the transmission request packet for the quick editor executable file that was transmitted from the personal computer 20 based on the processing at step S103 (YES at step S124), the CPU 31, in response to the request from the personal computer 20, transmits the quick editor executable file that is stored in the disk area 54 of the flash ROM 34 to the personal computer 20 (step S125).

The CPU 2 of the personal computer 20 receives the quick editor executable file that is transmitted by the printer 10, based on the processing at step S125, in response to the transmission request packet for the quick editor executable file that was transmitted at step S103 (step S104). After the CPU 2 stores the received quick editor executable file in the RAM 4, making it possible for the quick editor executable file to be started up, the CPU 2 starts up the quick editor executable file (step S105).

Figure 13:
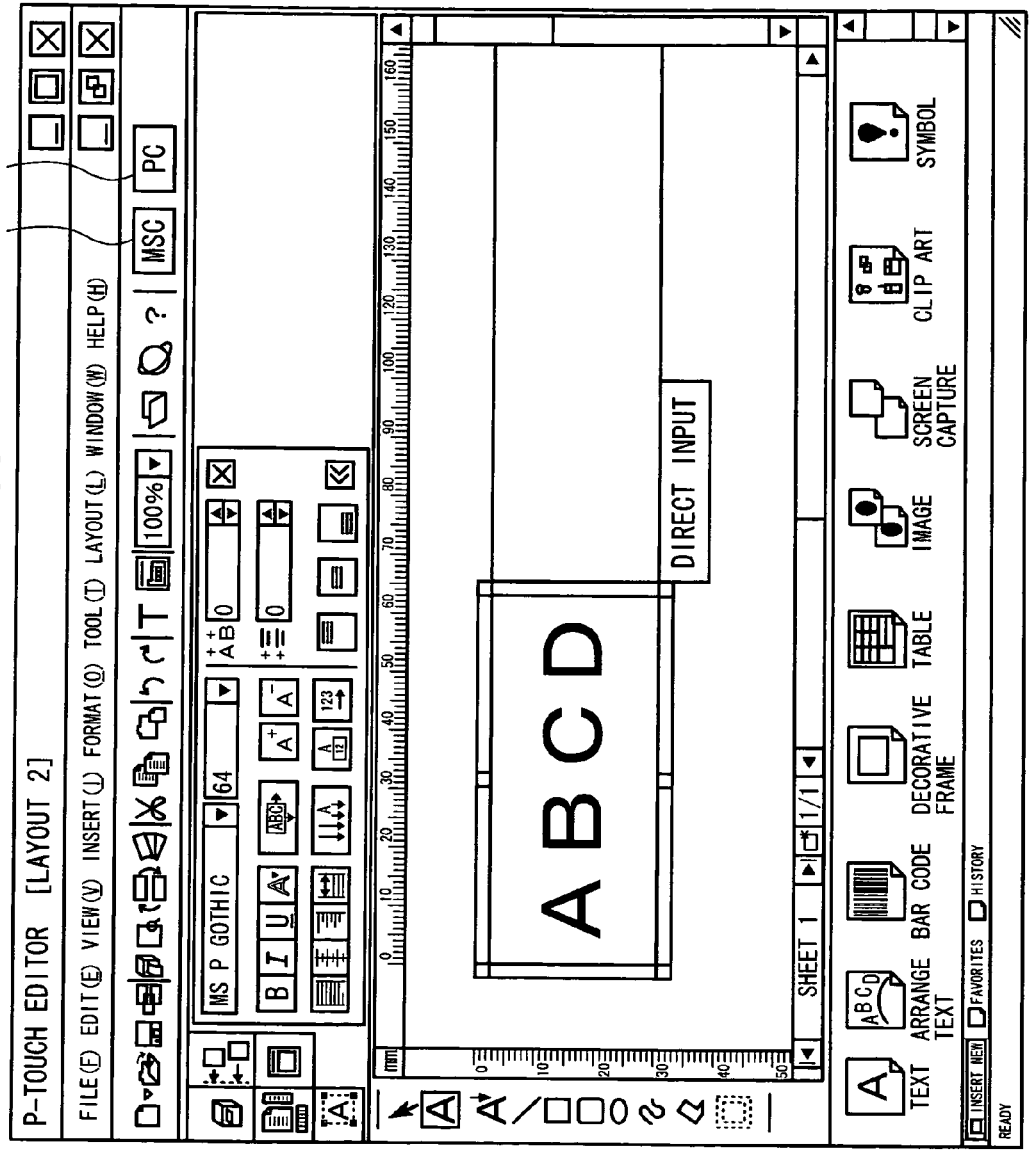
FIG. 13 is an example of a print data creation screen for a quick editor.

An example of a screen that is displayed on the display 21 of the personal computer 20 when the quick editor is started up will be explained with reference to FIG. 13. As shown in FIG. 13, when the quick editor is started up, a window is displayed that is provided with a tool bar, a work space, and the like that allows editing of a character to be printed on the print tape. An "MSC" switching button 70 and a "PC" switching button 71 are also provided in the window. The switching button 70 is used for switching the operating state of the printer 10 to the storage device state. The switching button 71 is used for switching the operating state of the printer 10 to the printing device state.

The user may create the print data by continuing to use the currently operating quick editor that is being displayed (NO at step S107, described below). On the other hand, in a case where the user will switch to the full editor and create new print data, as well as in a case where the user will use the full editor to edit the print data that the user is currently creating with the quick editor, the operating state of the printer 10 needs to be switched from the storage device state to the printing device state. In such a case, the user may select the switching button 71 to switch the operating state of the printer 10 to the printing device state. If the switching button 71 is selected (YES at step S107, described below), the currently operating quick editor is shut down. After the operating state of the printer 10 is switched to the printing device state, the CPU 2 starts up the full editor. Then, the user may create and edit the print data.

Figure 10:
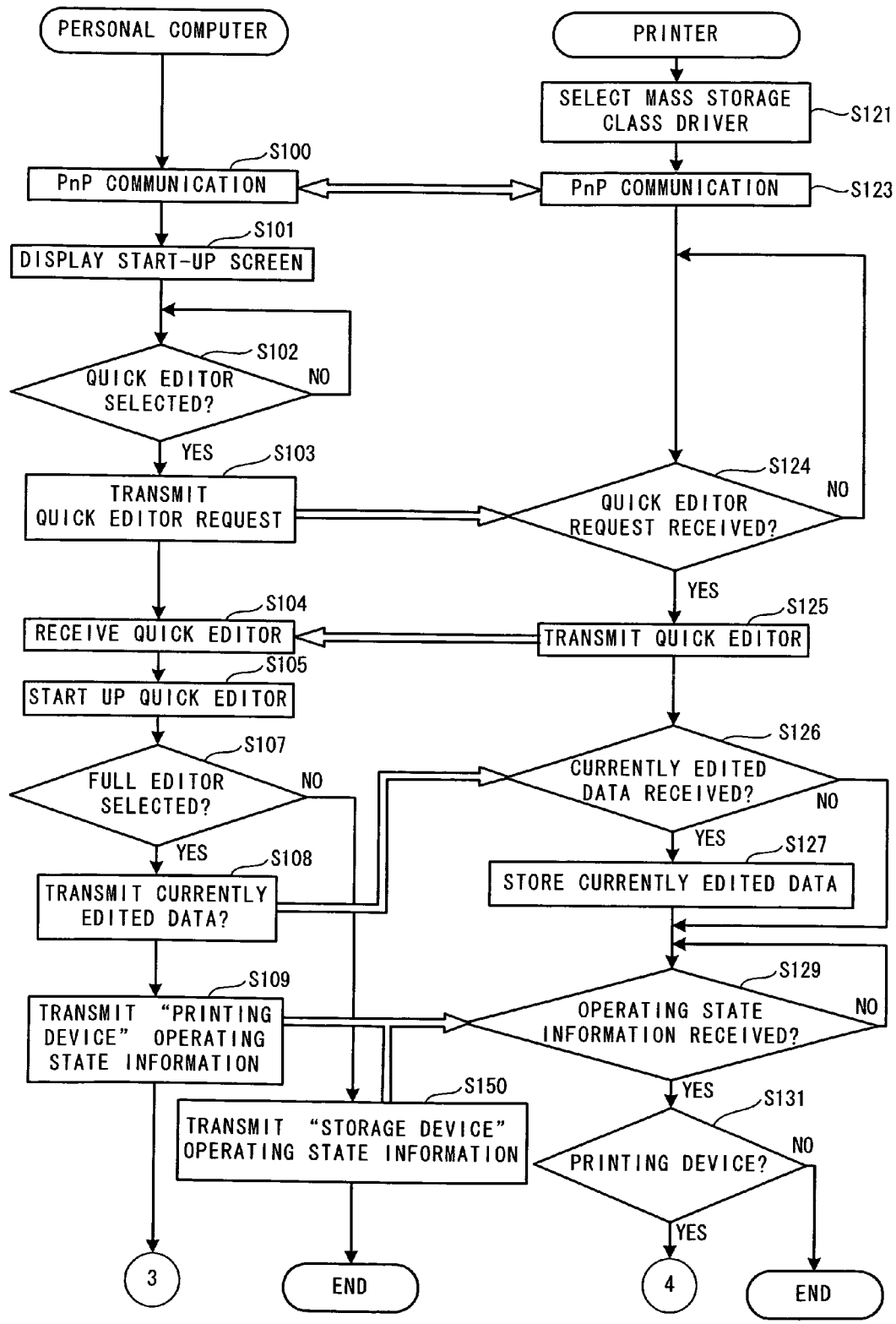
FIG. 10 is one part of a flowchart that shows a second embodiment of the operating state switching processing.

As shown in FIG. 10, after starting up the quick editor (step S105), the CPU 2 creates the print data based on operations by the user to create the print data. At the same time, the CPU 2 monitors whether the switching button 71 (refer to FIG. 13) has been selected (step S107). If the CPU 2 detects that the switching button 71 has been selected (YES at step S107), the CPU 2 performs processing to switch the operating state of the printer 10 from the storage device state to the printing device state and to start up the full editor (step S108 to step S119).

In a case where print data that is being edited with the quick editor exists, the CPU 2 stores the currently edited data in the disk area 54 of the flash ROM 34 of the printer 10, such that the currently edited data may be used even after the full editor is started up. Specifically, the CPU 2 transmits a packet of the currently edited data to the printer 10 (step S108). If the CPU 31 of the printer 10 receives the packet of the currently edited data that was transmitted by the personal computer 20 based on the processing at step S108 (YES at step S126), the CPU 31 stores the currently edited data that has been received in the disk area 54 of the flash ROM 34 (step S127). If the CPU 31 does not receive the packet of the currently edited data (NO at step S126), the processing proceeds directly to step S129.

After transmitting the data that is being edited to the printer 10 at step S108, the CPU 2 transmits to the printer 10 the operating state information for switching the operating state of the printer 10 to the printing device state (step S109).

After storing the currently edited data in the disk area 54 of the flash ROM 34 at step S127, the CPU 31 of the printer 10 waits while the CPU 31 does not receive the operating state information from the personal computer 20 (NO at step S129). When the CPU 31 receives the operating state information (YES at step S129), the CPU 31 determines whether the received operating state information is the operating state information that was transmitted by the personal computer 20 based on the processing at step S109 (the information for switching the operating state of the printer 10 to the printing device state) (YES at step S131). This sort of case may correspond to the case in which the user is trying to create the print data using the full editor.

Figure 11:
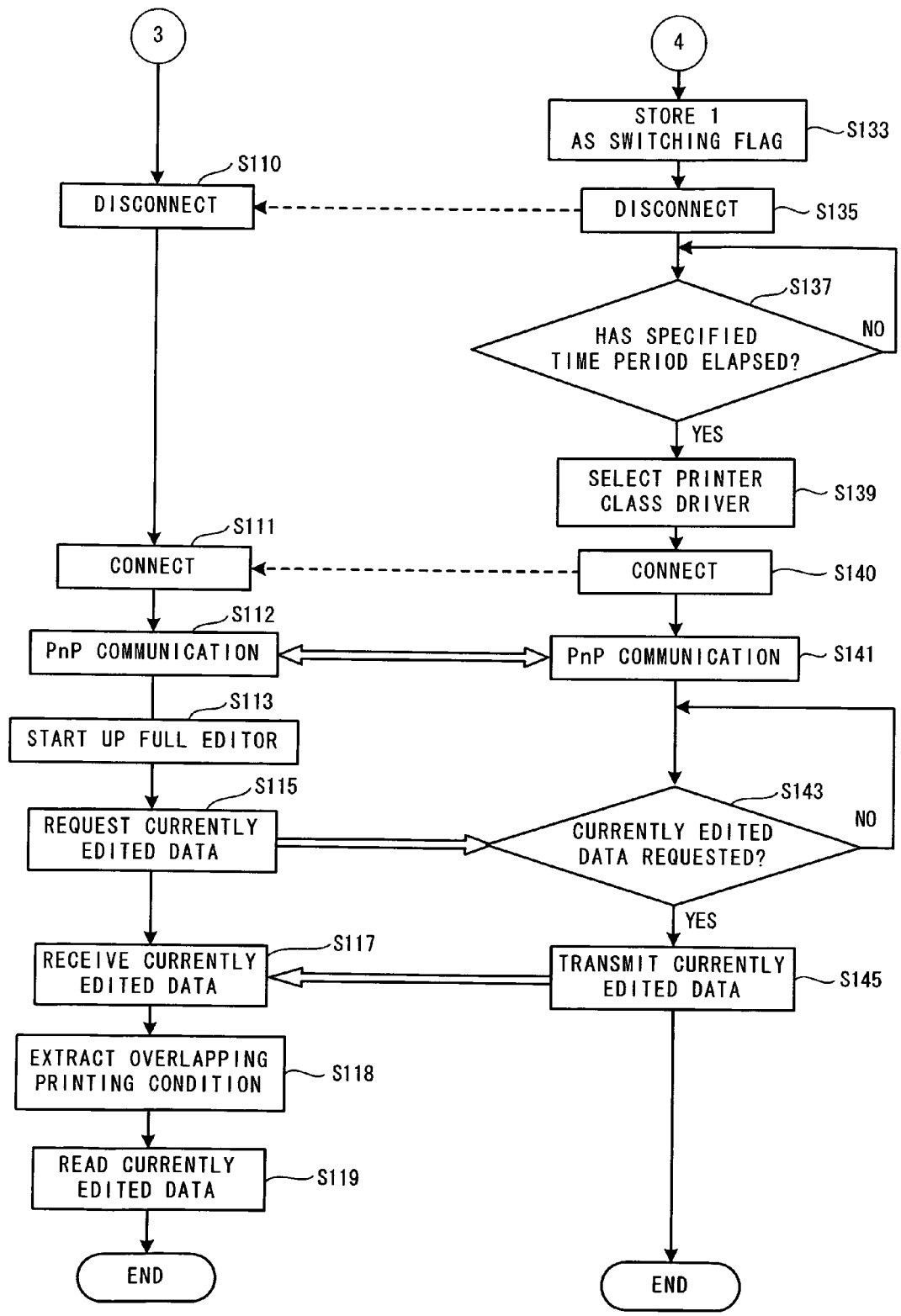
FIG. 11 is the other part of the flowchart that shows the second embodiment of the operating state switching processing.

As shown in FIG. 11, in order to select and read out the printer class driver 58 as the USB device driver, the CPU 31 stores 1 as the switching flag that is stored in the flag area 62 of the SRAM 33 (step S133). Next, in order to cause the personal computer 20 to determine that the connection to the printer 10 has been disconnected, the CPU 31 cancels the pull-up setting that was set for the D+ signal of the signal line of the USB cable 11 and puts the D+ signal into a high-impedance state (step S135).

The CPU 2 of the personal computer 20 detects that the D+ signal of the signal line of the USB cable 11 has been changed from the pull-up state to the high-impedance state. This enables the CPU 2 to recognize that the printer 10 that was connected via the USB cable 11 has been disconnected (step S110).

Next, in order to allow the CPU 2 to determine with certainty that the personal computer 20 is in a state of disconnection from the printer 10, the CPU 31 of the printer 10 waits while a specified period of time has not elapsed (NO at step S137). After the specified period of time has elapsed (YES at step S137), the CPU 31, in order to read out and use the USB device driver, reads out the switching flag that is stored in the flag area 62 of the SRAM 33. In this case, because 1 was stored as the switching flag in the processing at step S133, the CPU 31 selects and reads out the printer class driver 58 as the USB device driver (step S139).

Next, in order to cause the personal computer 20 to determine that the personal computer 20 is connected to the printer 10, the CPU 31 once again sets the D+ signal of the signal line of the USB cable 11 from the high-impedance state to the pull-up state (step S140). The CPU 2 of the personal computer 20 detects that the D+ signal has been changed to the pull-up state. This enables the CPU 2 to determine that the printer 10 is connected via the USB cable 11 (step S111).

Next, PnP communication is performed between the CPU 2 of the personal computer 20 and the CPU 31 of the printer 10, in the same manner as in the first embodiment (step S112 for the CPU 2, step S141 for the CPU 31). Here, the CPU 2 determines that the operating state of the connected printer 10 is the printing device state. In such a case, the CPU 2 may transmit the print data to the printer to cause print processing to be performed.

After the PnP communication ends, the CPU 2 of the personal computer 20 starts up the installed full editor (step S113). Next, in order to read out the currently edited data that is stored in the disk area 54 of the flash ROM 34 of the printer 10 (refer to FIG. 10, step S108), and to continue to perform editing of the currently edited data, the CPU 2 transmits to the printer 10 a transmission request packet for the currently edited data, thus requesting the printer 10 to transmit the currently edited data (step S115).

After the PnP communication (S141), the CPU 31 of the printer 10 waits while the CPU 31 does not receive the transmission request packet for the currently edited data from the personal computer 20 (NO at step S143). If the CPU 31 receives the transmission request packet for the currently edited data that was transmitted from the personal computer 20 based on the processing at step S115 (YES at step S143), the CPU 31, in response to the request from the personal computer 20, transmits the currently edited data that is stored in the disk area 54 of the flash ROM 34 to the personal computer 20 (step S145). The CPU 2 of the personal computer 20 receives the currently edited data that is transmitted by the printer 10, based on the processing at step S145, in response to the transmission request packet for the currently edited data that was transmitted at step S115 (step sS117).

In this case, the currently edited data that has been received was created with the quick editor, so the currently edited data includes the first printing conditions as the printing conditions. The first printing conditions may include a printing condition that is different from the second printing conditions, which may be edited with the full editor. Accordingly, the CPU 2 extracts a printing condition that overlaps with the second printing conditions, which may be edited with the currently operating full editor, from among the first printing conditions included in the currently edited data that has been received (step S118). Hereinafter, the printing condition that overlaps with the second printing conditions, which may be edited with the currently operating full editor, from among the first printing conditions included in the currently edited data that has been received is referred to as the "overlapping printing condition". The CPU 2 reads out the currently edited data in a state in which only the overlapping printing condition that is extracted at step S118 from among the printing conditions in the currently edited data that has been received is effective, such that the currently edited data may be edited with the full editor (step S119). Thus, the user may use the full editor to continue editing the currently edited data. The operating state switching processing in the CPU 2 then ends.

The print data that has been created using the full editor is stored in the HDD 6 of the personal computer 20. Then, in a case where the CPU 2 causes the printer 10 to perform the print processing based on the print data, the CPU 2 transmits the created print data to the printer 10 via the USB cable 11. If the CPU 31 of the printer 10 receives the print data via the USB cable 11, the CPU 31 controls the drive circuits 43 and 44 to drive the thermal head 40 and the tape feeding roller 41 based on the stored print data such that the processing to print on the print tape may be performed.

On the other hand, in a case where the full editor has not been installed in the personal computer 20 in advance and the print data is created using the quick editor in an operative state (NO at step S107), the operating state of the printer 10 may be left in the storage device state. The CPU 2 of the personal computer 20 transmits to the printer 10 an information data packet that notifies the printer 10 that the operating state of the printer 10 will be maintained in the storage device state (step S150). The user then may use the currently operating quick editor to create the print data.

After the CPU 31 of the printer 10 transmits the quick editor executable file to the personal computer 20 (step S125), if the CPU 31 receives the operating state information that was transmitted by the personal computer 20 based on the processing at step S150 (NO at step S126; YES at step S129), the received operating state information is information for maintaining the printer 10 in the storage device state (NO at step S131), so the CPU 31 ends the operating state switching processing without performing any particular processing.

The print data created with the quick editor may be transferred to the printer 10 and may be stored in the disk area 54 of the flash ROM 34. Accordingly, print processing may be performed by the printer 10 based on the print data. In a case where a print command is entered by the user, the CPU 31 controls the drive circuits 43 and 44 to drive the thermal head 40 and the tape feeding roller 41 based on the print data stored in the disk area 54 of the flash ROM 34 such that the processing to print on the print tape may be performed.

As explained above, in the printing system 1 in the second embodiment, the printer 10 is started up in the storage device state. When the personal computer 20 is connected to the printer 10, the quick editor is started up in the personal computer 20. The quick editor includes the function that may switch the operating state of the printer 10 (refer to FIG. 13, the switching buttons 70 and 71). The function may be used to switch the operating state of the printer 10 in a case where the user uses the full editor. This renders unnecessary the switching program that is necessary in the first embodiment. It is therefore possible to cut back on the storage capacity, and it is also possible to eliminate the work of preparing the switching program in advance.

In the second embodiment, first the quick editor is started up. In a case where the user switches to and uses the full editor, the user may wish to continuously edit the currently edited data, that is, the print data in the process of being created with the quick editor, with the full editor. In such a case, the currently edited data may be stored in the disk area 54 of the flash ROM 34 of the printer 10. After the full editor is started up, the CPU 2 may read out the currently edited data that has been stored. When the quick editor is being used, the printer 10 is operating in the storage device state, so the CPU 2 may easily access the disk area 54 in which the currently edited data may be stored. Accordingly, the user's convenience may be improved because different editors may be used to read out and edit the currently edited data in a case where the user switches among and uses the editors to create the print data.

The print data that is created with an editor includes printing conditions in addition to information on a text to be printed. The printing conditions that may be edited differ considerably depending on the editor. Therefore, in a case where the currently edited data that has been created with the quick editor is read out and is continuously edited with the full editor, as in the second embodiment described above, the second printing conditions, which may be edited with the full editor, may not include all the first printing conditions, which are included in the print data that was created with the quick editor. In such a case, the CPU 2 of the personal computer 20 extracts the overlapping printing condition from the printing conditions included in the currently edited data. The overlapping printing condition is a printing condition that may be edited with the full editor that is used to continuously edit the data. The CPU 2 then reads out the currently edited data in a state in which only the overlapping printing condition is effective. This makes it possible to prevent a state in which the editing work cannot continue to be performed due to the differences between a printing condition included in the currently edited data and a printing condition that may be edited with the editor to be used to continuously edit the data.

The present disclosure is not limited to the second embodiment described above, and various types of modifications may be possible. For example, a function may also be provided that switches the operating state of the printer 10 to halt the use of the full editor while editing is in progress and use the quick editor to continue editing the currently edited data. In such a case, the currently edited data in the course of being created with the full editor may be transmitted to the printer 10 in the same manner as in the processing at step S108 when the quick editor is being used, as described above. The currently edited data that was transmitted may be stored in the disk area 54 of the flash ROM 34 of the printer 10, in the same manner as in the processing at step S127. Thus, in a case where the quick editor, which is different from the full editor, is started up, the currently edited data may be continuously edited with the quick editor by reading out the currently edited data that has been stored in the disk area 54. Furthermore, the overlapping printing condition may be extracted in the same manner as in the processing at step S118 when the full editor is being used, and the currently edited data may be read such that the currently edited data may be edited with the quick editor in a state in which only the overlapping printing condition is effective. Accordingly, the user may use the full editor to continue editing the currently edited data.

In the second embodiment, the currently edited data is stored in the disk area 54 of the flash ROM 34 of the printer 10. However, the area where the currently edited data is stored is not limited to the disk area 54 of the flash ROM 34. For example, data created with an editor may also be stored in one of the storage areas (the HDD 6 and the RAM 4) that the personal computer 20 includes.

In the second embodiment, in a case where the editor is switched and a different editor is used, the currently edited data is stored in the disk area 54 of the flash ROM 34 of the printer 10. Then, the operating state of the printer 10 is switched by using the editor's function for switching the operating state of the printer 10 (the function that is performed by selecting one of the switching buttons 70 and 71 in FIG. 13). However, the method of switching the operating state of the printer 10 is not limited to this method. For example, the switching program explained in the first embodiment may also be used. In that case, the CPU 2 may store the currently edited data in the disk area 54 of the flash ROM 34 of the printer 10 when the CPU 2 terminates the editor that is being used. Next, the CPU 2 may start up the switching program and switch the operating state of the printer 10. Then, in a state in which a different editor has been started up, the CPU 2 may read out the currently edited data that was stored in the disk area 54 and continue performing the work of editing the currently edited data.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A terminal connectable to a printer, comprising:
   a terminal communication device that performs communication with the printer;
   a terminal memory that stores at least an executable file for a second editor program, the second editor program being a program for editing print data;
   an executable file receiving device that receives an executable file for a first editor program stored in a printer memory of the printer by using the terminal communication device, the first editor program being a program for editing the print data;
   a first execution device that executes the executable file for the first editor program received by the executable file receiving device, in a state in which the terminal recognizes the printer as a device capable of using the printer memory;
   a second execution device that executes the executable file for the second editor program stored in the terminal memory, in a state in which the terminal recognizes the printer as a device capable of printing by using a printing device;
   an operating state information transmission device that transmits to the printer operating state information, the operating state information being information for switching an operating state of the printer to one of a storage device state and a printing device state, the storage device state being an operating state that causes the terminal to recognize the printer as the device capable of using the printer memory, and the printing device state being an operating state that causes the terminal to recognize the printer as the device capable of printing by using the printing device;
   a memory control device that stores currently edited data in one of the printer memory and the terminal memory, if the operating state information is transmitted by the operating state information transmission device while the print data is being edited, in one of a case where the first execution device executes the executable file for the first editor program to start up the first editor program and a case where the second execution device executes the executable file for the second editor program to start up the second editor program, the currently edited data being print data being edited; and
   an editing continuation device that continues editing the currently edited data stored by the memory control device, based on one of the started first editor program and the started second editor program, after the operating state of the printer has been switched based on the operating state information transmitted by the operating state information transmission device.

2. The terminal according to claim 1, wherein:
   the operating state information transmission device transmits the operating state information based on the first editor program;
   the second editor program is started up after the operating state of the printer has been switched based on the operating state information transmitted by the operating state information transmission device; and
   the editing continuation device reads out the currently edited data being edited based on the first editor program from one of the printer memory and the terminal memory, and continues editing the currently edited data based on the second editor program.

3. The terminal according to claim 1, wherein:
   a first currently edited data includes first printing condition information, the first currently edited data being the print data being edited based on the first editor program, and the first printing condition information being information pertaining to a printing condition of the first currently edited data;
   a second currently edited data includes second printing condition information, the second currently edited data being the print data being edited based on the second editor program, and the second printing condition information being information pertaining to a printing condition of the second currently edited data;
   the terminal further comprises a printing condition extraction device that extracts an overlapping printing condition, the overlapping printing condition being a printing condition overlapping between the first printing condition information and the second printing condition information,
   wherein the editing continuation device continues editing one of the first currently edited data in a state in which the overlapping printing condition extracted from the first printing condition information by the printing condition extraction device is effective and the second currently edited data in a state in which the overlapping printing condition extracted from the second printing condition information by the printing condition extraction device is effective.

4. A printing system, comprising:
   a printer; and
   a terminal that is connectable to the printer,
   wherein the printer comprises:
      a printer memory that stores at least an executable file for a first editor program, the first editor program being a program for editing print data;
      a printer communication device that performs communication with the terminal;
      a printing device that prints based on the print data;
      an operating state information receiving device that receives operating state information, the operating state information indicating that an operating state of the printer is one of a storage device state and a printing device state, the storage device state being an operating state that causes the terminal to recognize the printer as a device capable of using the printer memory, and the printing device state being an operating state that causes the terminal to recognize the printer as a device capable of printing by using the printing device; and
      a switching device that switches the operating state of the printer to one of the storage device state and the printing device state, based on the operating state information received by the operating state information receiving device,
and
the terminal comprises:
- a terminal communication device that performs communication with the printer;
- a terminal memory that stores at least an executable file for a second editor program, the second editor program being a program for editing the print data and being different from the first editor program;
- an executable file receiving device that receives the executable file for the first editor program stored in the printer memory by using the terminal communication device;
- a first execution device that executes the executable file for the first editor program received by the executable file receiving device, in a state in which the terminal recognizes the printer as the device capable of using the printer memory;
- a second execution device that executes the executable file for the second editor program stored in the terminal memory, in a state in which the terminal recognizes the printer as the device capable of printing by using the printing device;
- an operating state information transmission device that transmits the operating state information to the printer;
- a memory control device that stores currently edited data in one of the printer memory and the terminal memory, if the operating state information is transmitted by the operating state information transmission device while the print data is being edited, in one of a case where the first execution device executes the executable file for the first editor program to start up the first editor program and a case where the second execution device executes the executable file for the second editor program to start up the second editor program, the currently edited data being print data being edited; and
- an editing continuation device that continues editing the currently edited data stored by the memory control device, based on one of the started first editor program and the started second editor program, after the operating state of the printer has been switched based on the operating state information transmitted by the operating state information transmission device.

* * * * *